(12) United States Patent
Taniguchi et al.

(10) Patent No.: US 7,159,113 B1
(45) Date of Patent: Jan. 2, 2007

(54) DISTRIBUTION INFORMATION MANAGEMENT SYSTEM AND METHOD

(75) Inventors: Shinichiro Taniguchi, Nakai-machi (JP); Kenji Kawano, Nakai-machi (JP); Kil-ho Shin, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/454,865

(22) Filed: Dec. 7, 1999

(30) Foreign Application Priority Data

Apr. 22, 1999 (JP) .................................. 11-115551

(51) Int. Cl.
*H04L 9/00* (2006.01)

(52) U.S. Cl. ....................... 713/170; 713/155; 713/176; 713/193; 380/45; 380/278

(58) Field of Classification Search ................ 717/11; 705/54, 28; 380/21, 51; 713/155; 235/375
See application file for complete search history.

(56) References Cited

U.S. PATENT DOCUMENTS

| | | | | | |
|---|---|---|---|---|---|
| 5,117,096 | A | * | 5/1992 | Bauer et al. ................ | 235/375 |
| 5,544,086 | A | * | 8/1996 | Davis et al. ................ | 705/68 |
| 5,661,803 | A | * | 8/1997 | Cordery et al. ............. | 705/60 |
| 5,982,896 | A | * | 11/1999 | Cordery et al. ............. | 705/62 |
| 6,005,945 | A | * | 12/1999 | Whitehouse ................ | 380/51 |
| 6,072,874 | A | * | 6/2000 | Shin et al. ................. | 380/231 |
| 6,185,683 | B1 | * | 2/2001 | Ginter et al. ............... | 713/176 |
| 6,189,146 | B1 | * | 2/2001 | Misra et al. ................ | 717/177 |
| 6,285,916 | B1 | * | 9/2001 | Kadaba et al. .............. | 700/222 |
| 6,397,332 | B1 | * | 5/2002 | Kawano et al. ............. | 713/176 |
| 6,466,921 | B1 | * | 10/2002 | Cordery et al. ............. | 705/60 |
| 6,539,360 | B1 | * | 3/2003 | Kadaba ...................... | 705/28 |
| 6,651,167 | B1 | * | 11/2003 | Terao et al. ................ | 713/168 |
| 6,996,723 | B1 | * | 2/2006 | Kyojima et al. ............ | 713/193 |
| 2001/0018660 | A1 | * | 8/2001 | Sehr ........................... | 705/5 |
| 2001/0044780 | A1 | * | 11/2001 | Miyazaki et al. ............ | 705/53 |

(Continued)

FOREIGN PATENT DOCUMENTS

JP    A-5-298332    11/1993

(Continued)

OTHER PUBLICATIONS

Bruce Schneier; "Applied Cryptography", 1996; John Wiley & Sons; Second edition; p. 38.*

(Continued)

*Primary Examiner*—Nasser Moazzami
*Assistant Examiner*—Carl Colin
(74) *Attorney, Agent, or Firm*—Oliff & Berridge, PLC

(57) ABSTRACT

Distributors can verify a signature without acquisition of a certificate for each signer from the certificate authority. A signature part calculates a hash value of distribution information and sets it to a variable h (step S412). Signer private information is taken out from a first signer private information storage part and set to the variable d (step S413). A signature key information selection part takes out signature key information corresponding to a product identifier pid from a signature key information storage part and sets it to the variable t, n (step S414). A signature part calculates a first signature value to the variable h by use of signer private information d and sets it to the variable r1 (step S415). A distribution information generating part calculates a second signature value to the variable h by use of a signature key information t according to the variable h (step S416). A signature value to the final variable h is calculated by use of the results r1 and r2.

20 Claims, 34 Drawing Sheets

U.S. PATENT DOCUMENTS

2002/0013898 A1* 1/2002 Sudia et al. ................ 713/155

FOREIGN PATENT DOCUMENTS

| JP | A-9-261217 | 10/1997 |
|---|---|---|
| JP | A-10-133578 | 5/1998 |
| JP | A-10-171905 | 6/1998 |
| JP | A-10-324405 | 12/1998 |
| JP | A-11-73461 | 3/1999 |

OTHER PUBLICATIONS

Hitachi Hyoron, "Next Generation Logistic System Using Non-Contact IC Technology," vol. 80, Apr. 4, 1998, pp. 35-40.

* cited by examiner

BASIC STRUCTURE

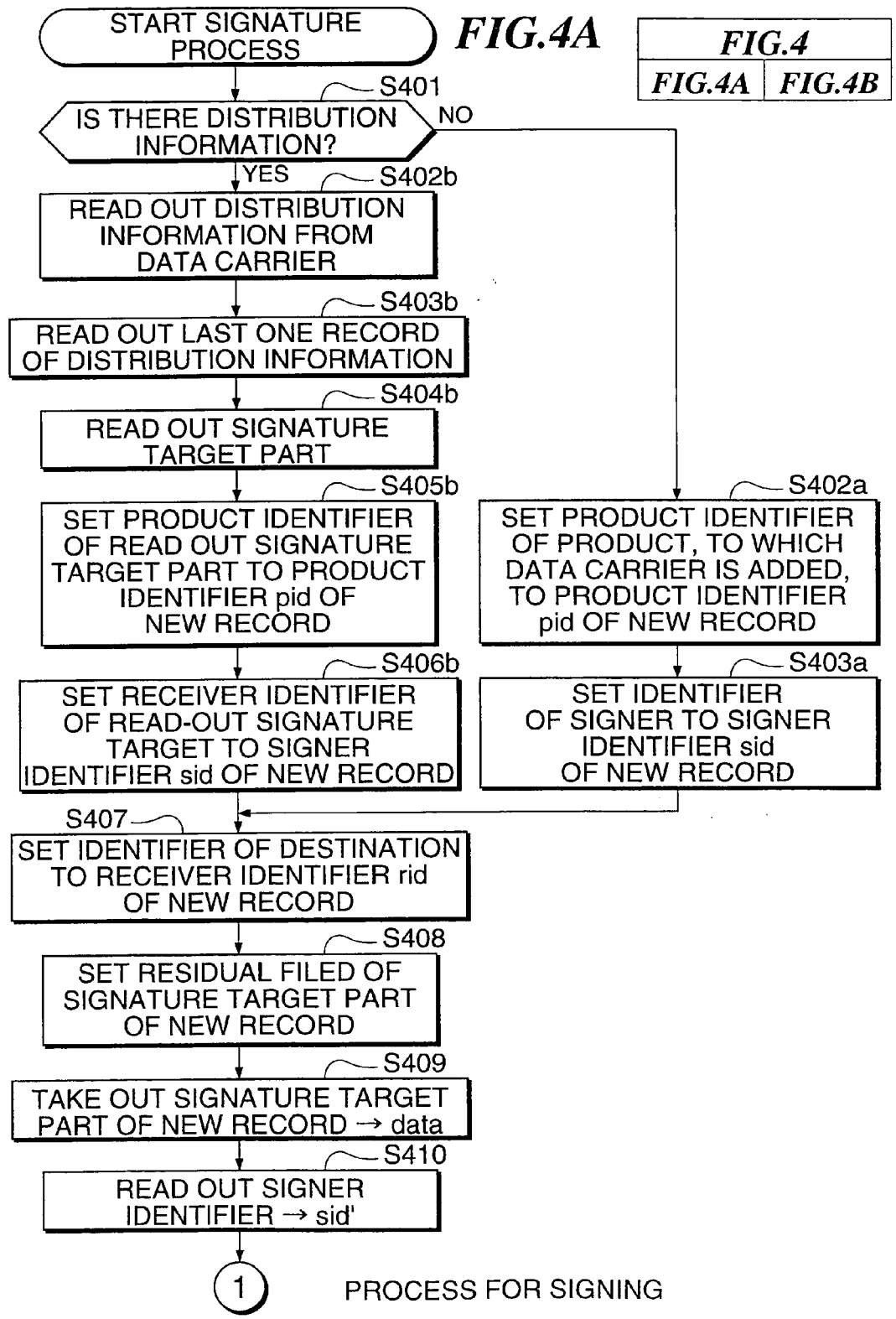

PROCESS FOR SIGNING

PROCESS FOR
SIGNATURE
KEY INFORMATION
ACQUISITION

PROCESS FOR
SIGNATURE
KEY INFORMATION
ACQUISITION

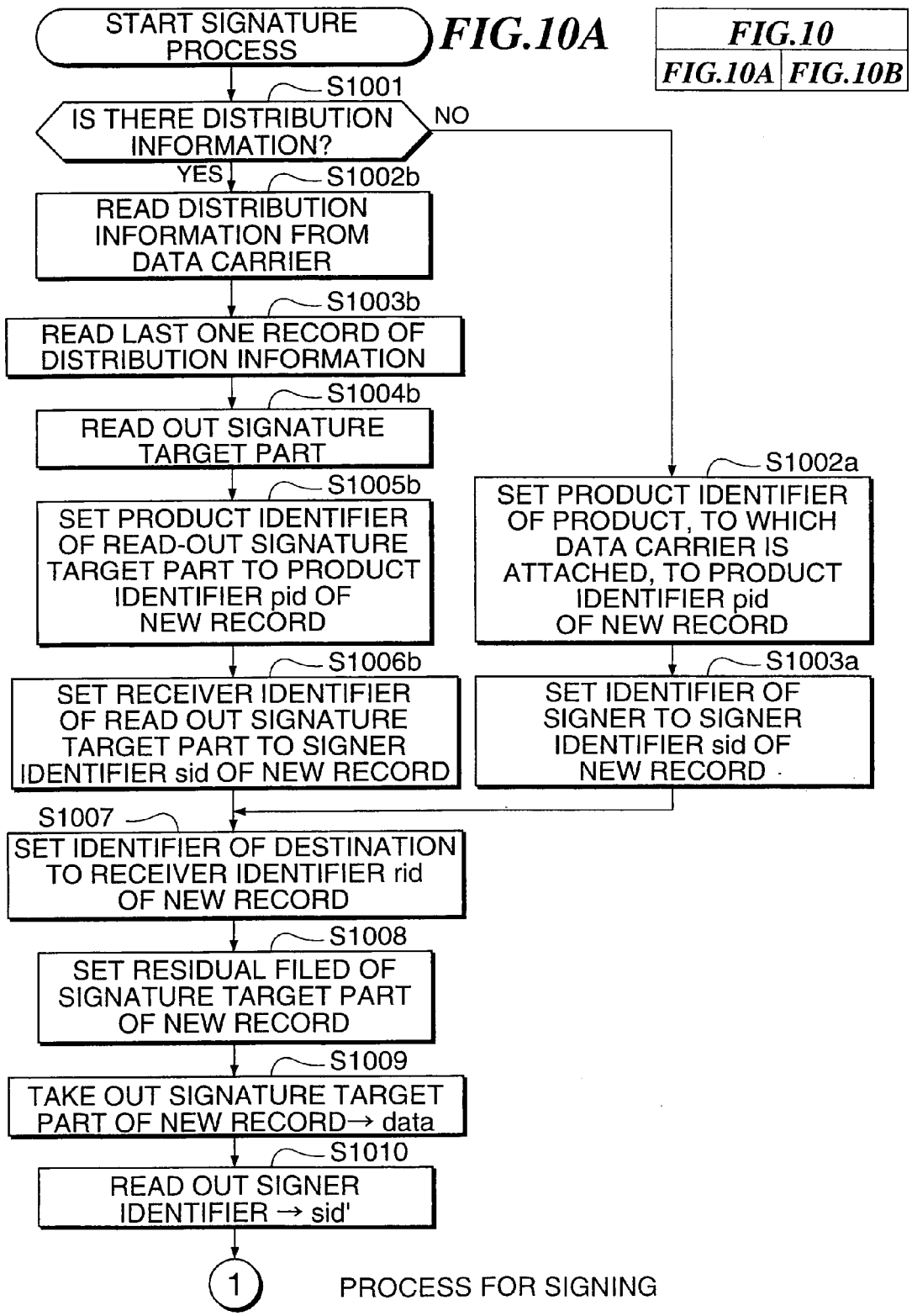

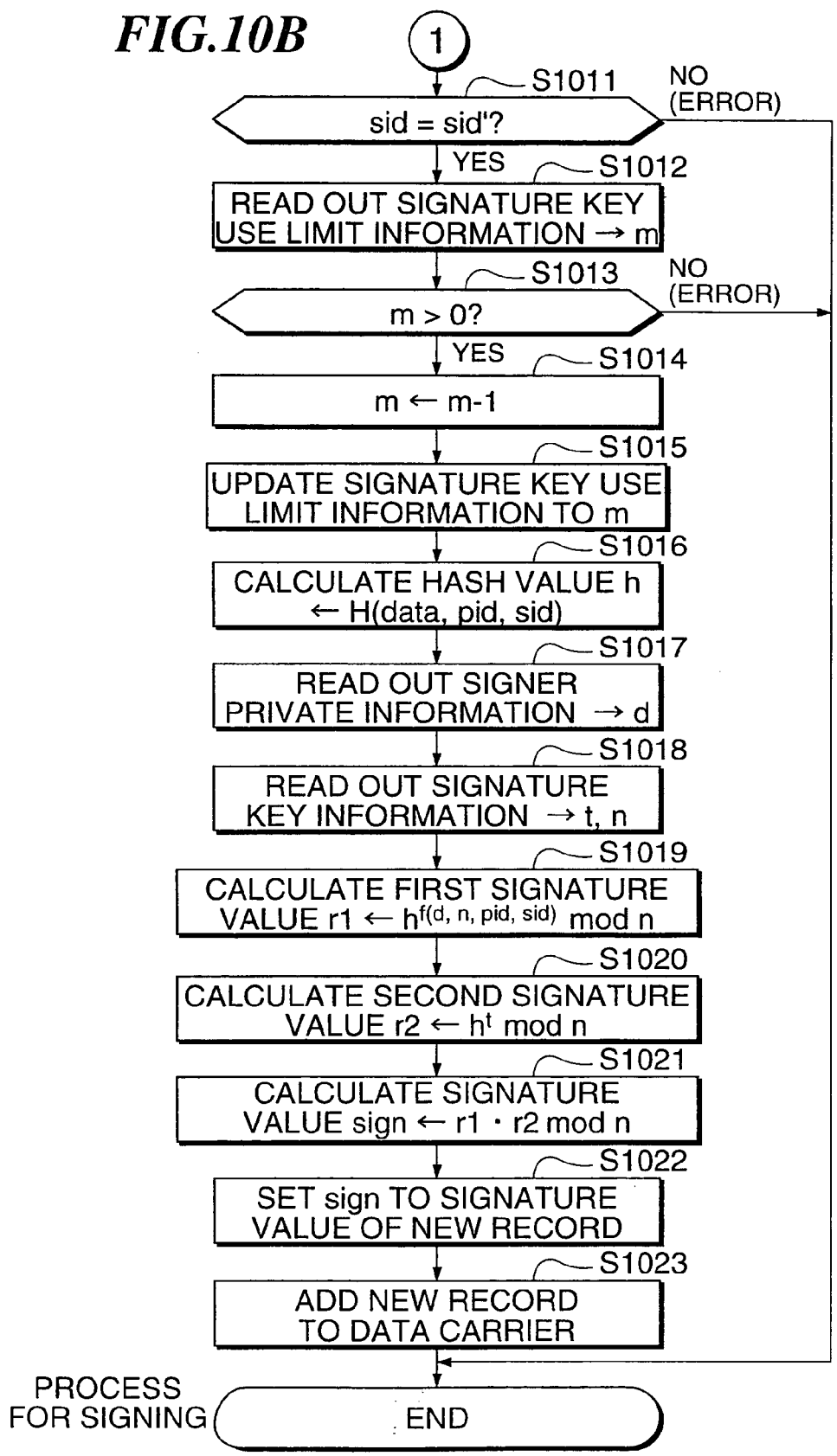

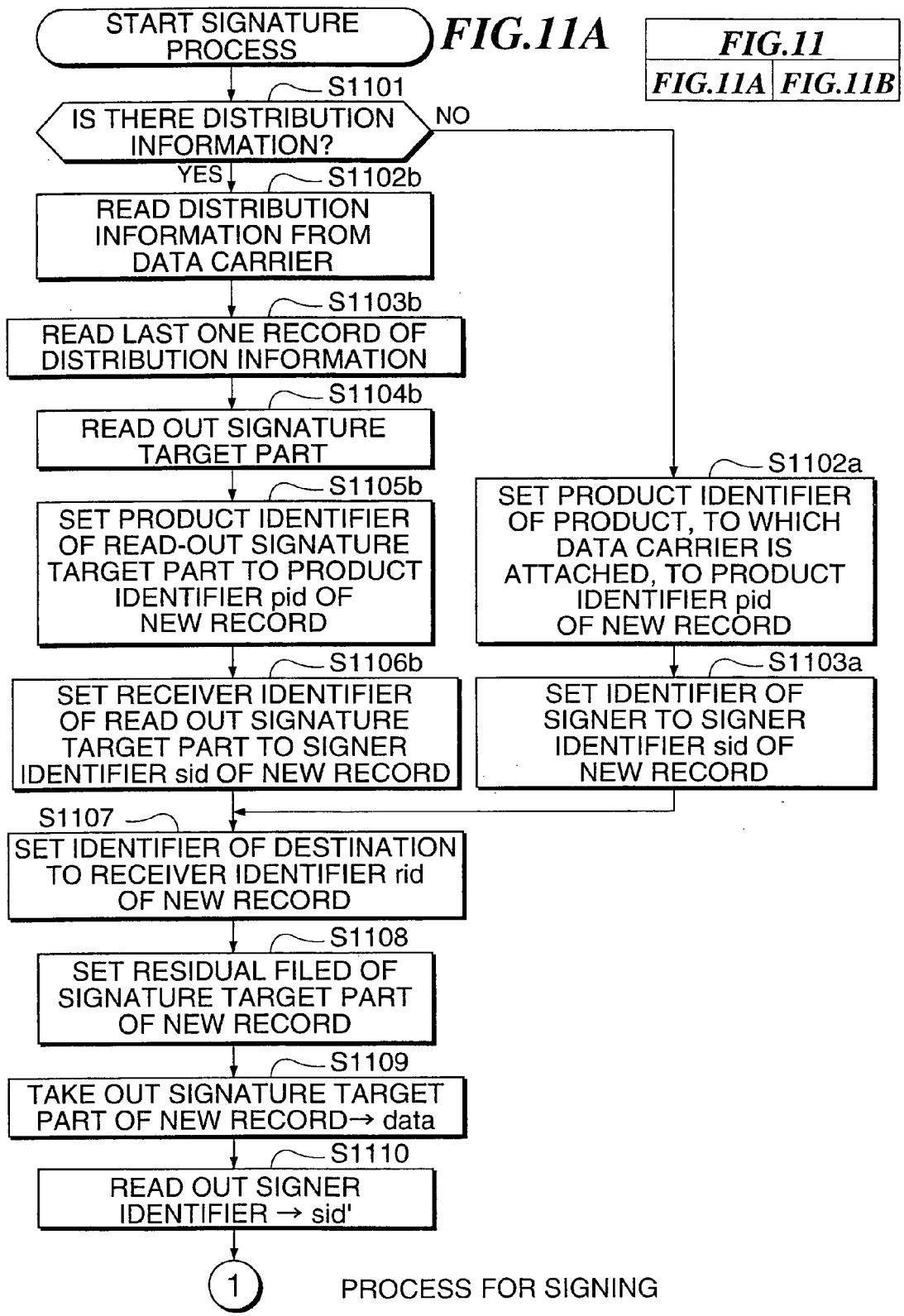

PROCESS FOR SIGNING

SIGNATURE KEY INFORMATION
GENERATING MODULE

PROCESS FOR
SIGNATURE
KEY INFORMATION
ACQUISITION

PROCESS FOR SIGNATURE KEY
INFORMATION ACQUISITION

SIGNATURE VERIFICATION PROCESSIN. THE CASE WHERE THERE IS ONLY ONE SIGNATURE VALUE IN DATA CARRIER

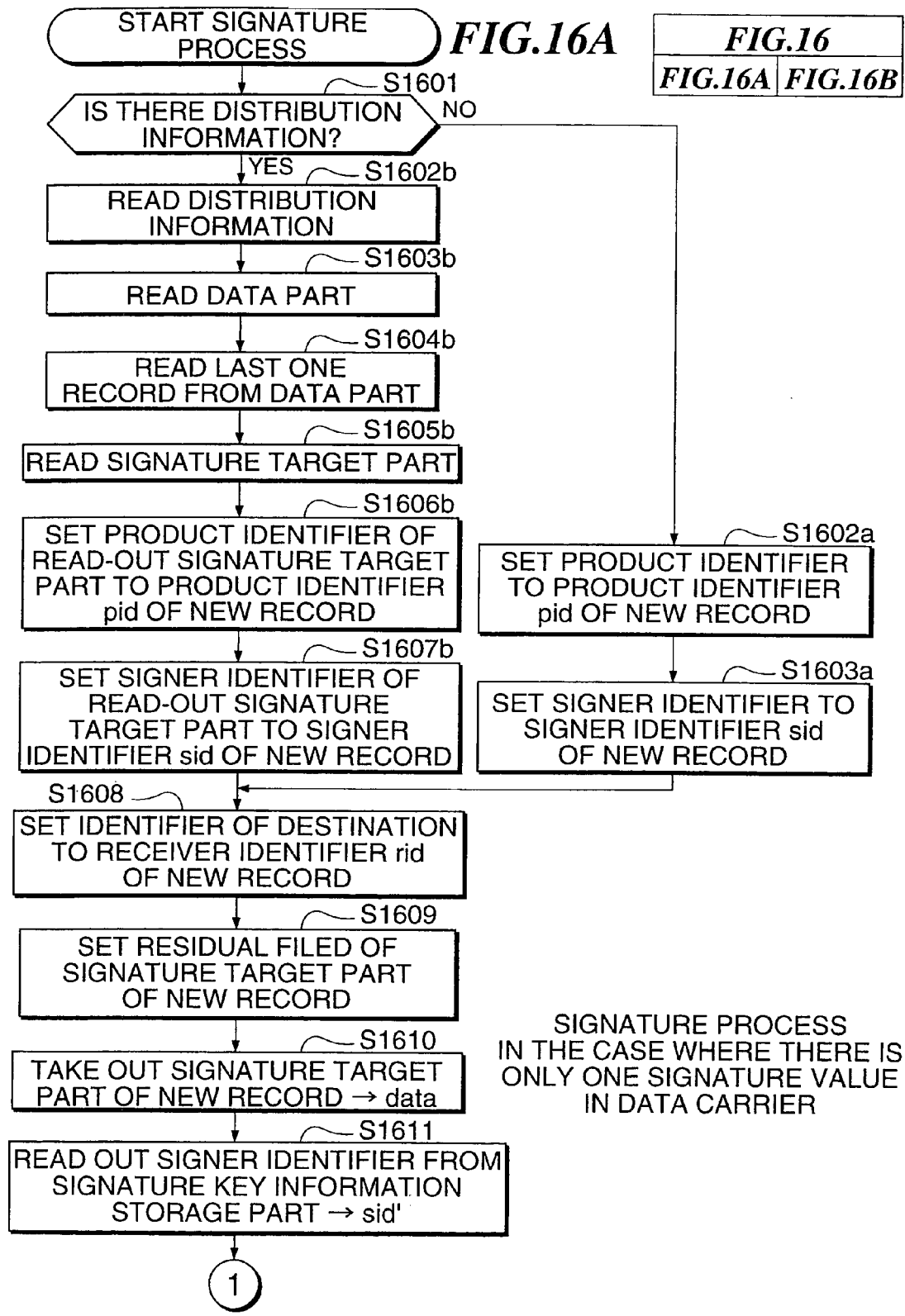

SIGNATURE PROCESS IN THE CASE WHERE THERE IS ONLY ONE SIGNATURE VALUE IN DATA CARRIER

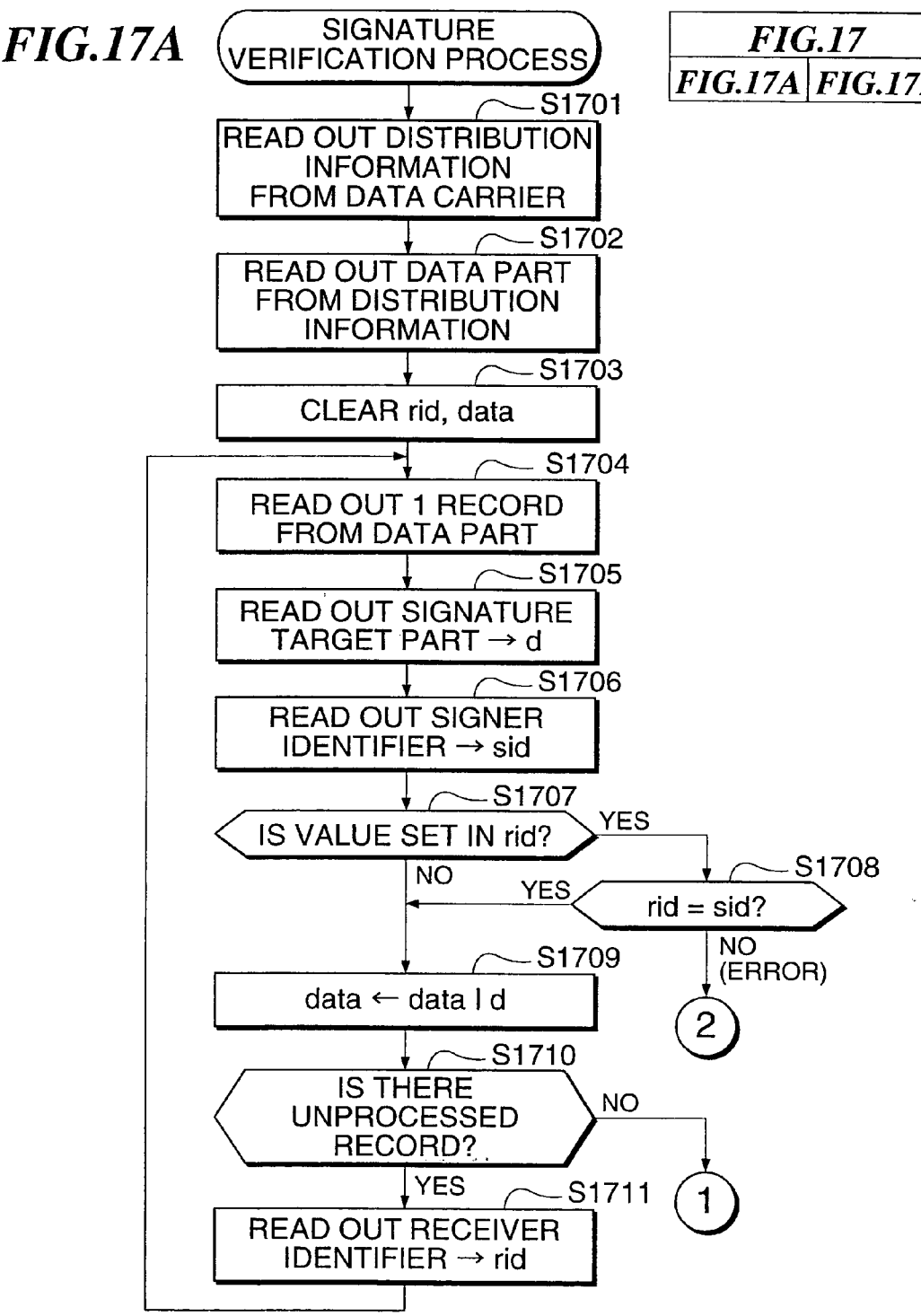

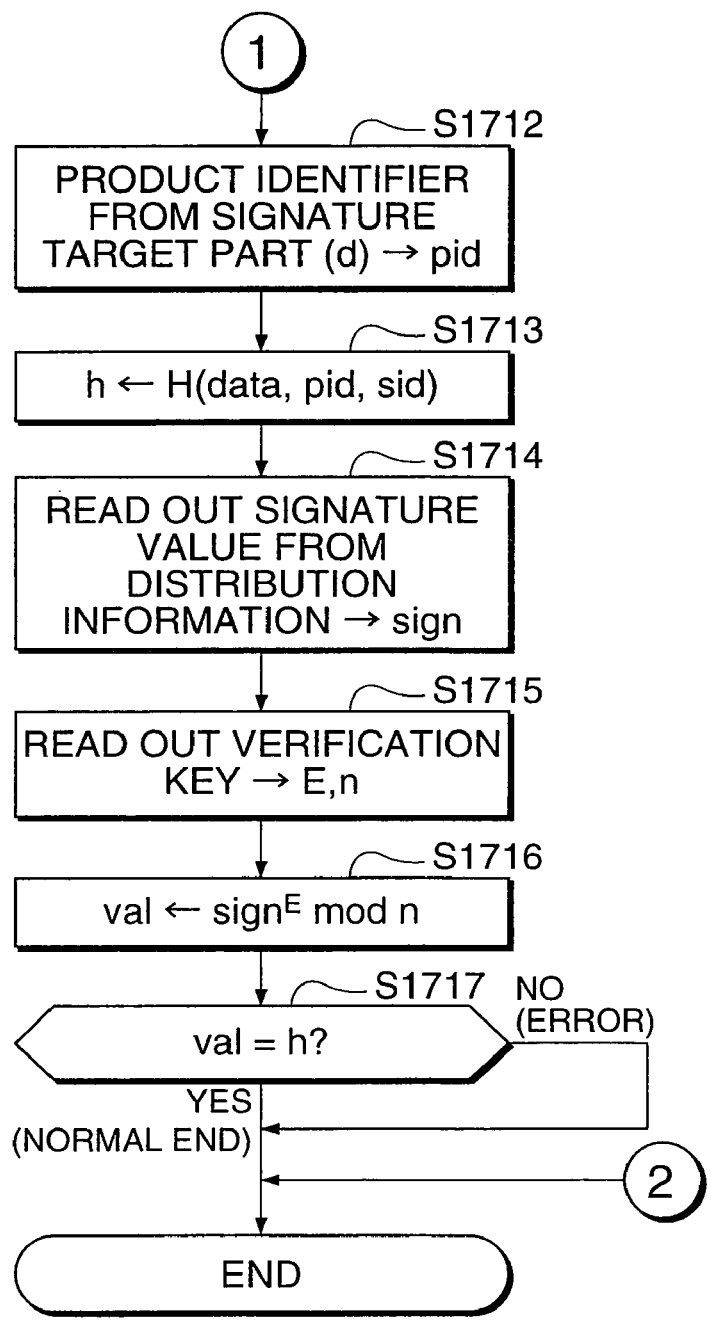

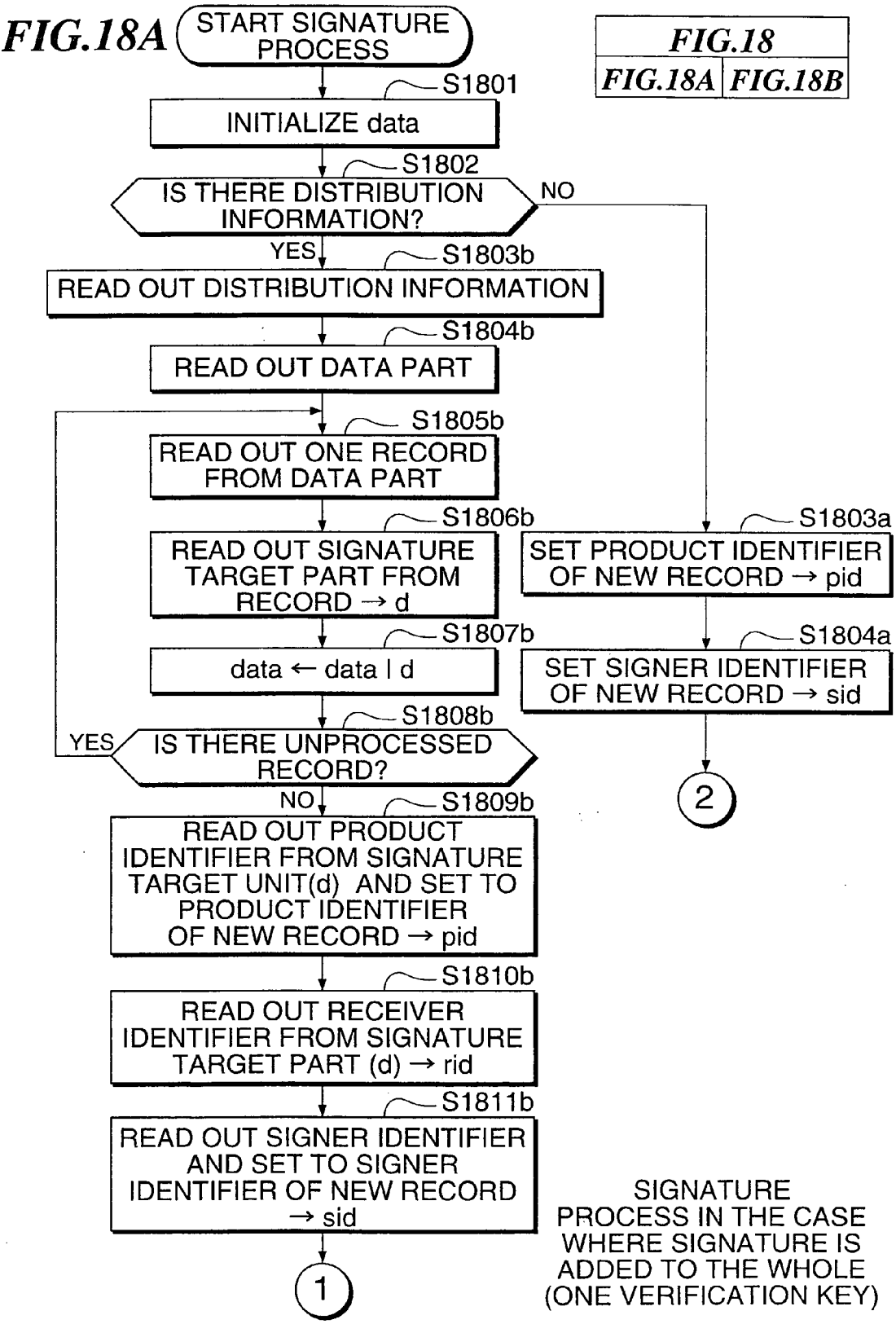

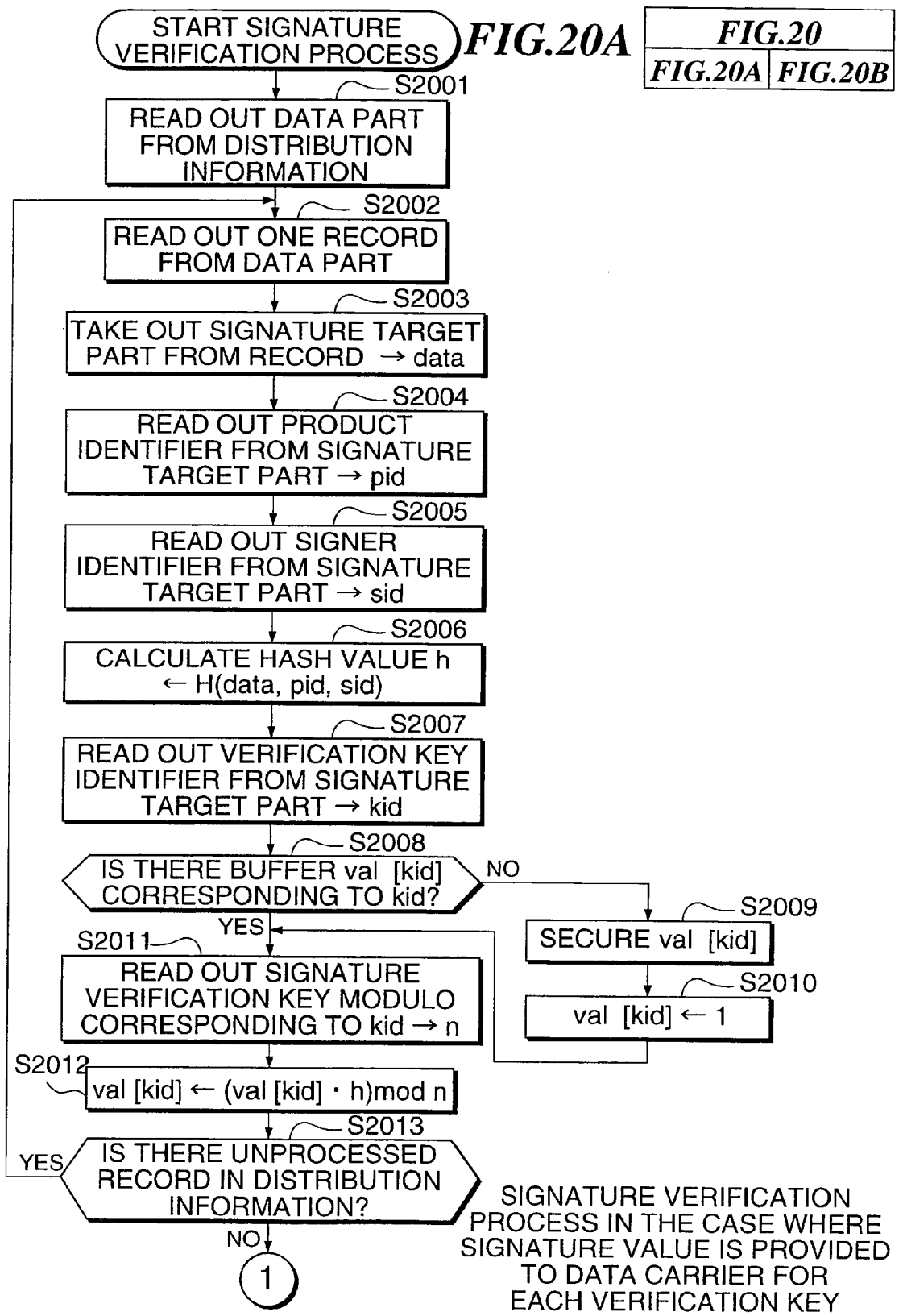

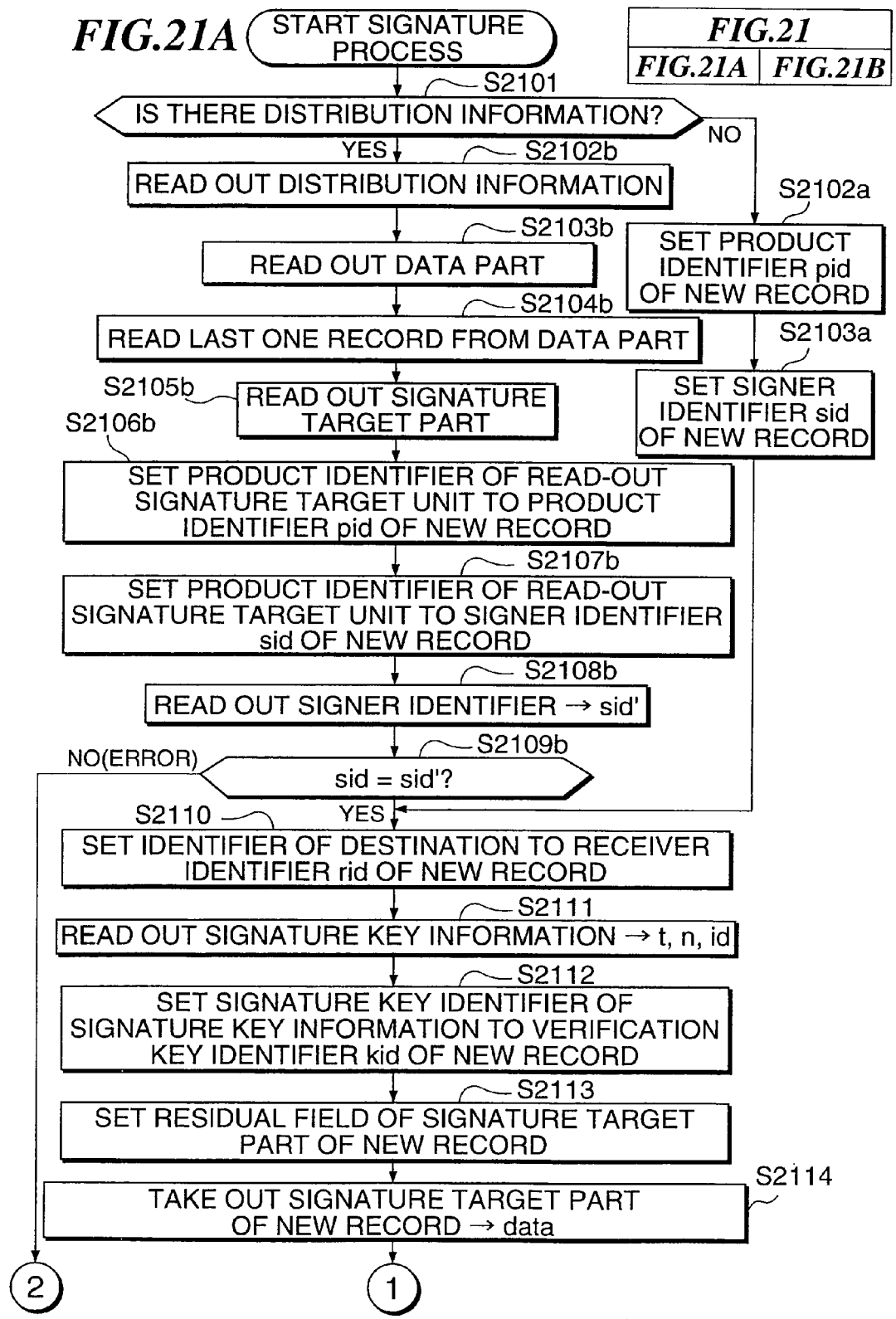

SIGNATURE PROCESS IN THE CASE WHERE SIGNATURE VALUE IS PROVIDED IN DATA CARRIER FOR EACH VERIFICATION KEY

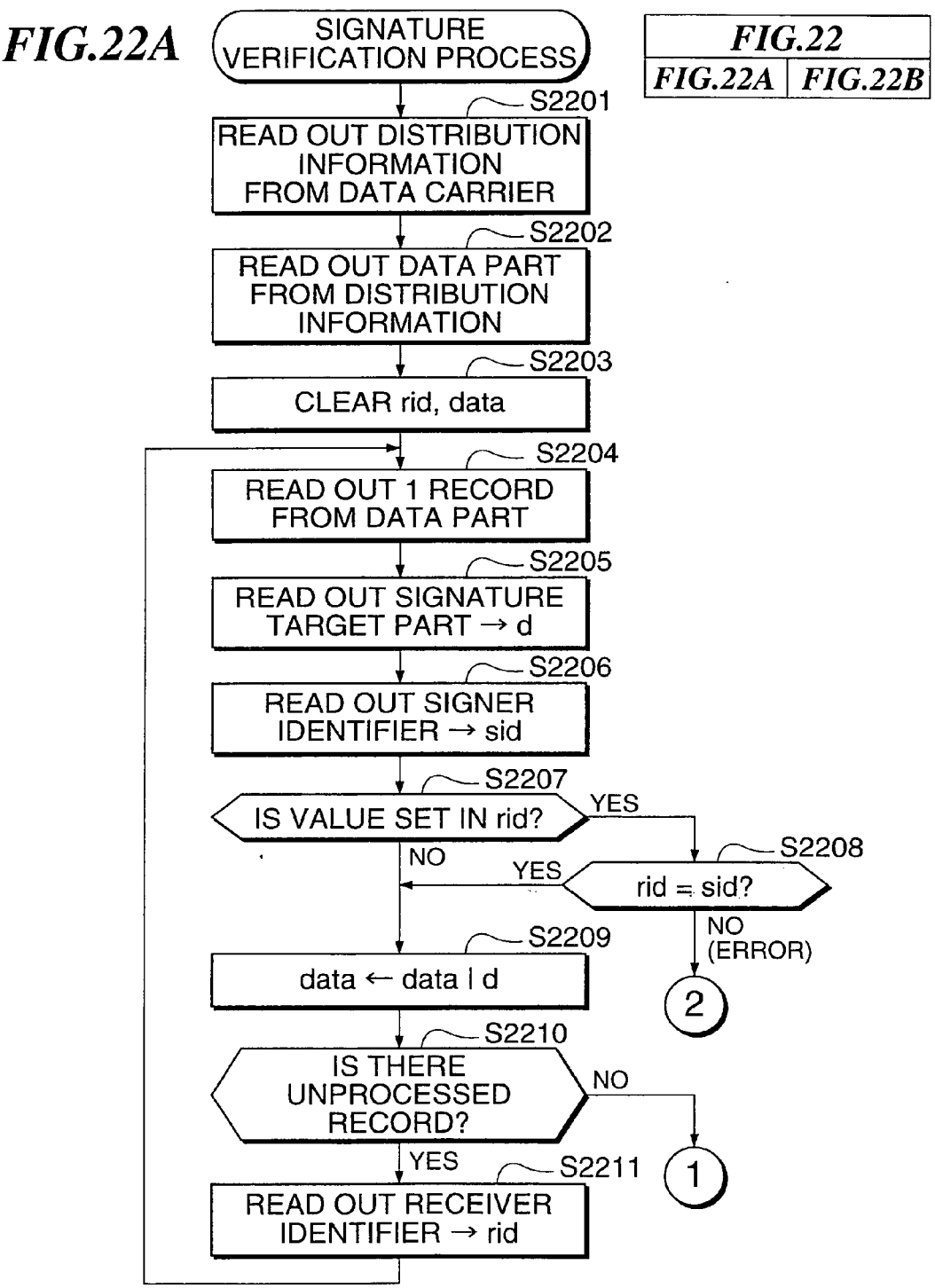

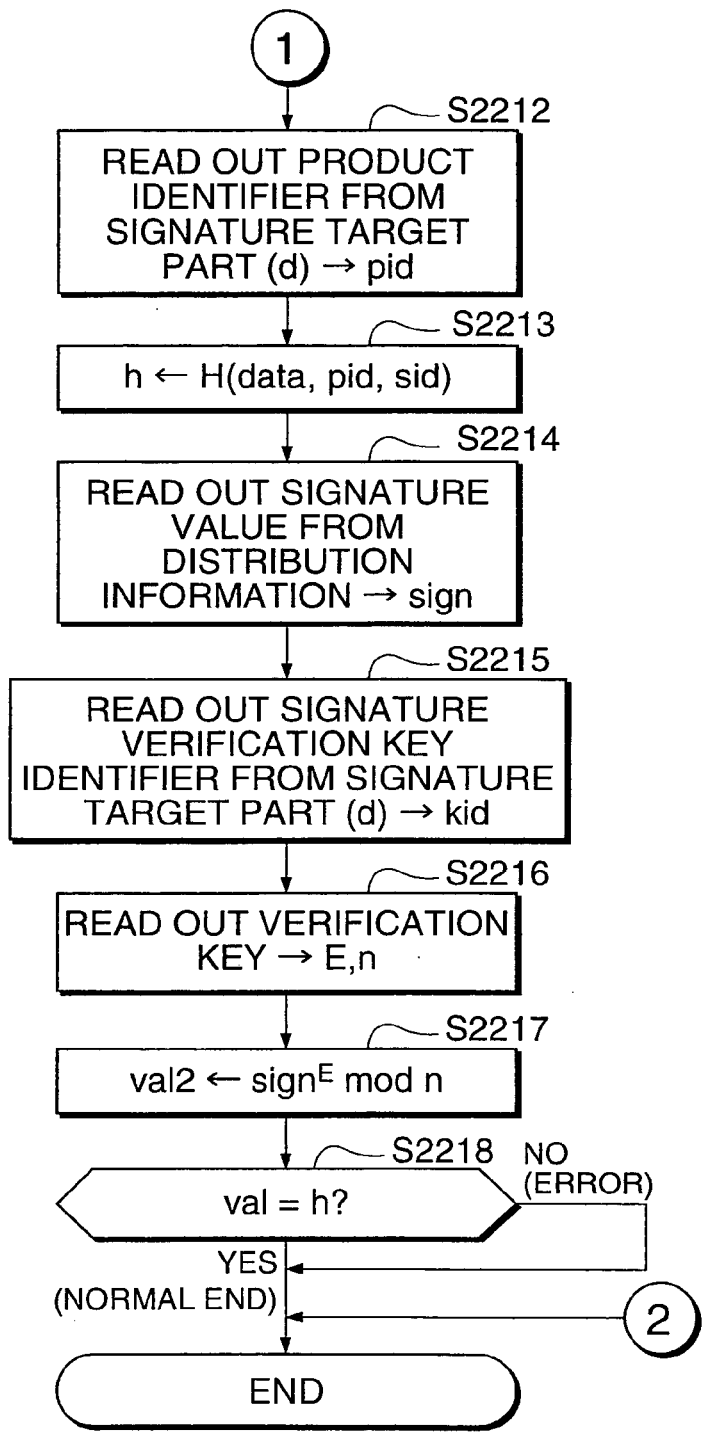

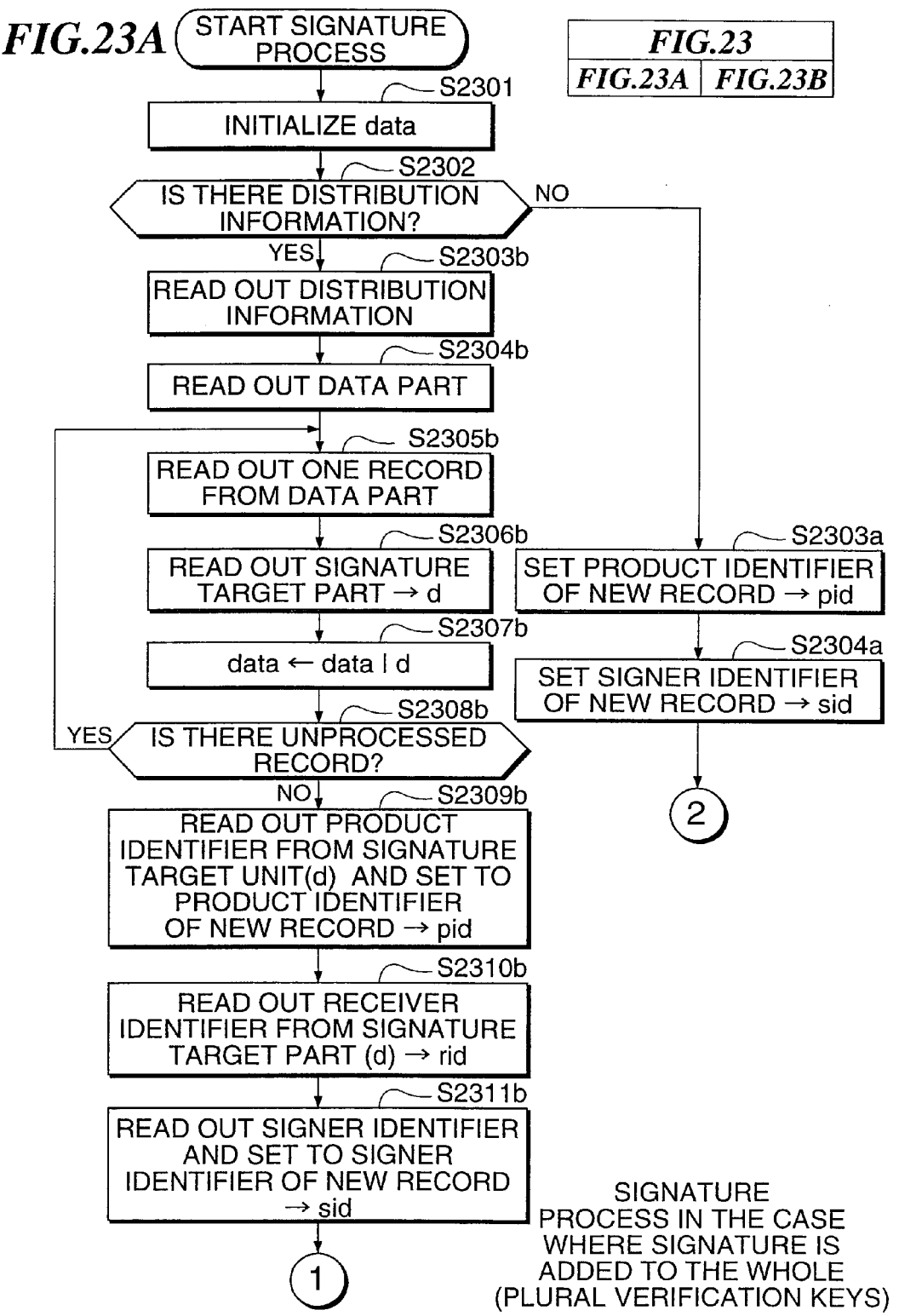

SIGNATURE PROCESS IN THE CASE WHERE SIGNATURE IS ADDED TO THE WHOLE (A PLURALITY OF VERIFICATION KEYS)

STRUCTURE OF MODIFIED EXAMPLE

DISTRIBUTION INFORMATION MANAGEMENT SYSTEM AND METHOD

BACKGROUND OF THE INVENTION

1. Field of the Invention

This invention relates to a technique for managing the distribution of products, to each of which a data carrier is attached, by use of the information in the data carrier.

2. Description of the Related Art

There have been known conventional distribution management systems for improving the efficiency and consistency of distribution operation by use of a data carrier which is capable of electromagnetically reading/storing the data for management of products.

For example, Japanese Published Unexamined Patent Application No. Hei 5-298332 titled as "Distribution system using data carrier" discloses a distribution system using a non-contact type data carrier which is capable of reading/storing the information. The merchandise specific data are stored in the data carrier, for example, the name of the product, locality, and the number of products are stored. When a product is knocked down, the ID of the buyer is added to the data carrier. When a buyer buys a product to a retailer, the ID of the retailer, the number of products, the price, and the shipping data are added. A data carrier is also provided to a dolly or a track, the information of all the products loaded on the dolly such as the number of carloads is stored in advance in the data carrier. A product is loaded automatically on the target dolly with reference to the ID of the retailer, and then loaded on a target track having a data carrier which stores the same ID.

By using the method described hereinabove, misshipment due to wrong shipping address, shipping data, and shipping quantity is avoided. Furthermore, by using a data carrier as a checker for checking incoming from and outgoing to a market, a theft of the product is prevented.

Japanese Published Unexamined Patent Application No. Hei 10-324405 titled as "Merchandise shipping system" discloses a merchandise shipping system which is capable of confirming the content of a product correctly by use of an electronic tag. An electronic tag is attached to a product in advance, the product information is read out by means of a radio system from the electronic tag by a distributor side to prepare content information which indicates the product in the package, and the distributor gives the content information to a receiver. On the receiver side, the product information is received by the receiver by means of a radio system to check the product in comparison with the content information.

By using such a merchandise shipping system, because the content in the package is checked after packaging by means of an electronic tag attached to the product and the product information read out from the electronic tag in the package is compared with the content information which indicates the product list to check the product n the receiver side, the product is checked without involvement of a person, the shipping and approval of the product are performed correctly.

The reliability of merchandise shipping management is increased by improvement of such a distribution management system, but still now the problem that genuine products are replaced by fraudulent products in the distribution flow is not solved. According to the method described hereinabove, though the shipping work is automated consistently and the product is checked correctly, it is easy for distributors to replace genuine products by fraudulent products in the distribution flow fraudulently, and it is very difficult to find out who had replaced genuine products by fraudulent products when fraudulent products are mixed.

To exclude such a fraudulent practice, a modified method in which the information is stored together with a signature in an electronic tag (data carrier) has been proposed. An electronic tag is referred to as a data carrier hereinafter. Because a handling record and a signature for the handling record of distributors are stored in a data carrier, when some fraudulent products are found, it is possible to specify the distributor who has mixed the fraudulent products by specifying the distribution flow passage. If a signature on the handling information is not added or a signature is fraudulent, the distributor or the next distributor who has received the products from the distributor is suspected.

The digital signature technique has been known as a technique to put a signature on the distribution information as described hereinabove. As a representative example of such digital signature technique. ElGamal signature technique in which the difficulty of discrete logarithm problem is the base of the safety has been known. ElGamal signature technique is described hereunder.

A signature key is denoted by (x,y,p) and a verification key is denoted by (y,y,p) wherein p denotes a prime number and y denotes a positive constant smaller than p. These integers are in relation represented by the equation (1)

$$(1) y = y^x \pmod{p} \qquad \text{[Equation 1]}$$

Calculation of the private integer x from the public integer y is a discrete logarithm problem, and it is difficult to get x by means of calculation if p is sufficiently large (500 bits or larger).

A prover generates a random number k which is mutually prime to p−1, and calculates a signature for a message m by use of the equations (2) and (3).

$$(2) r = y^k \pmod{p} \qquad \text{[Equation 2]}$$

$$(3) s = (h(m) - xr) k^{-1} \pmod{p-1} \qquad \text{[Equation 3]}$$

wherein h denotes a one-way hash function. A prover sends the message m and signature (r, s) to a verification side.

The verifier receives m and (r, s), and checks whether the equation (4) holds.

$$(4) y^{h(m)} = y^r r^s \pmod{p} \qquad \text{[Equation 4]}$$

If the equation holds, then it is proved that m is a message prepared by the prover.

In addition to the above-mentioned technique, as the digital signature technique, DSA (Digital Signature Algorithm) in which the difficulty of discrete logarithm problem is the base of the safely, Schnorr signature technique, and G-Q (Guillou, Quisquater) based on zero knowledge certification, and RSA (Rivest, Shamir, and Adleman) signature technique which is well known have been known.

However, application of digital signature techniques to signature for the distribution information which is stored in the data carrier involves the problem described hereunder.

For application of digital signature technique, a certificate authority is required to be established to issue the certificate of a verification key to respective signature keys of distributors. It needs an enormous facility and cost to establish a large-scale certificate authority which is capable of supporting distributors in the country or in the world. When a signature on the distribution information is to be verified, a verifier needs certificates for the respective distributors who have put their signatures, it is required that the verifier gets a certificate of the prover who authenticates from a certification authority each time or stores it in advance in a table. The former technique in which a certificate is obtained each time is disadvantageous in that the verification takes a long time if singers are many, and on the other hand the latter technique in which the certificate is stored in a table is also disadvantageous in that the complex management for managing the term of validity and checking of invalidated certificate is needed. Furthermore, because the signature key is a private information, attention must be paid in management for security. As described hereinabove, application of the digital signature technique needs establishment of a certificate authority, management of the certificate, and ensure of security of distributors, and these requirement requires enormous facility and troublesome operation.

Generally in the case where digital signature technique is employed, because the signature key is managed by a signer, the number of times of signing cannot be restricted. In this case, it is possible to put the signature repeatedly plural times on the same product, therefore it is possible that a distributor who is a signer puts the same ID as put on the genuine product on fraudulent products and ships it to another receiver. At that time, the signature put on the fraudulent product will be successful in verification, therefore the fraudulent product will be retailed to consumers as the genuine product until the existence of the product which has the same ID is revealed. This is a problem.

SUMMARY OF THE INVENTION

The present invention was accomplished to solve the above-mentioned problem, and provides a merchandise distribution management technique for signing with limitation of number of times of signing without introduction of enormous facility and troublesome operation.

According to the present invention, the distribution information management system has a data carrier attached to an article for storing the information of the article, a distribution information processing module for reading/storing the information from/in the data carrier, and a distribution information management module for managing the information relative to distribution of the article.

The distribution information processing module has a reading part that reads out the data of the data carrier, a storing part that stores the information in the data carrier, a first information verification unit that verifies the information read out from the data carrier, an information generating unit that processes the information to be stored in the data carrier; and a first communication part that communicates with the distribution information management module.

The first information verification unit has a first information verification part that verifies the information read out from the data carrier, and a first verification key storage part that stores the verification key used by the first information verification part for verification of the information.

The information generating unit has a distribution information generating part that generates the information to be stored in the data carrier, a signature module that performs signature generating process, a signature key storage part that stores the signature key information used by the signature module for generating a digital signature, a signature key information selection part that selects a signature key information stored in the signature key storage part, and a signature key information acquisition part that acquires the signature key information from the distribution information management module.

The signature module has a signature part that generates a digital signature for the information generated by the distribution information generating part, and a first signer private information storage part that stores a signer private information used by the signature part for generating a digital signature.

The distribution information management module has a second communication part that communicates with the distribution information processing module, a second information verification unit that processes the information received from the distribution information processing module, and a signature key information generating unit that processes the signature key information to be sent to the distribution information processing module.

The second information verification unit has a second information verification part that verifies the information received from the distribution information processing module; and a second verification key storage part that stores the verification key used by the second information verification part for verification of the information.

The signature key information generating unit ham a signature key information generating part that generates signature key information used by the distribution information processing module for generating distribution information, a signature key storage part that stores the signature key used by the signature key information generating part for generating a signature key information, a signer private information selection part that selects a signer private information used by the signature key information generating part for generating signature key information, and a second signer private information storage part that stores the signer private information.

According to the structure as described hereinabove, the distribution information processing module acquires signature key information peculiar to the module from the distribution information management module a signature is put on the distribution information by use of the signature key information and the signer private information, and a common verification key is used for verification of the signature. Accordingly, it is not necessary to communicate the verification key for each signer, and the required facility and troublesome work is reduced.

In the distribution information management system of the present invention, the signature module may be detachable from the distribution information processing module for replacement.

In the distribution information management system of the present invention, the signature module may be tamper-proof.

In the distribution information management system of the present invention, the information generating unit may have a signature key use limit information storage part so that the signature key information selection part does not select a signature key information used more than a specified number of times for signature.

In the distribution information management system of the present invention, the signature key use limit information storage part may be disposed in the signature module.

In the distribution information management system of the present invention, the distribution information processing module may have an information verification module and an information generating module, the information verification module may have a first reading part that reads the data of the data carrier and a first information verification unit that processes the information read out from the data carrier, and the information generating module may have a second reading part that reads the data of the data carrier, a storing part that stores the information in the data carrier, and an information generating unit that processes the information to be stored in the data carrier.

In the distribution information management system of the present invention, the distribution information management module may have a second information verification module and a signature key information generating module, the second information verification module may have a distribution information verification unit and a second communication part, and the signature key information generating module may have a signature key generating part and a third communication part.

In the distribution information management system of the present invention, the verification key stored in the first verification key storage part and the second verification key storage part may be common for all the distribution information processing modules and distribution information management modules.

In the distribution information management system of the present invention, the first information verification part and the second information verification part may perform the same process.

In the distribution information management system of the present invention, the first information verification unit has a first verification key selection part that selects the verification key used by the first information verification part. (The verification key can be changed for distribution information management modules or distribution management centers respectively. One example is the case where respective centers are provided for makers and brokers and retailers deal with products of different makers. A method in which the public key ID is used for switching and a method in which the center ID is used for switching have been known.)

In the distribution information management system of the present invention, the second information verification unit may have a second verification key selecting part that selects the verification key used by the second information verification part.

In the distribution information management system of the present invention, the signature key information generating unit has a signature key selection part that select a signature key.

In the distribution information management system of the present invention, the information stored in the data carrier may have at least a product identifier, a signer identifier, a receiver identifier, and a signature value, and which information is stored as one unit.

In the distribution information management system of the present invention, the information stored in the data carrier may at least contain a verification key identifier and which information is stored as one unit.

In the distribution information management system of the present invention, the information stored in the data carrier may at least contain a distribution information management module identifier and which information is stored as one unit.

In the distribution information management system of the present invention, the information stored in the data may at least contain a product identifier, a signer identifier, and a receiver identifier and, which information is stored as one unit, and the information has a signature value separately from the information for unit.

In the distribution information management system of the present invention, the information stored in the data carrier may at least contain a product identifier, a signer identifier, a receiver identifier, and a verification key identifier and which information is stored as one unit, and the information has a signature value corresponding to the verification key identifier for each verification identifier.

According to the present invention, a data carrier attached to an article for storing the information of the article stores distribution information of the article generated for each one or one set of transaction in the distribution process of the article, and at least part of a piece of the distribution information or at least part of each of serial pieces of the distribution information.

Fraudulent operation such as replacement with fraudulent products is excluded by employing the data carrier described hereinabove.

The distribution information of the article may contain at least the identifier of the article, the identifier of the receiver who received the article, and the identifier of the signer who generates the signature value.

In detail, the above-mentioned distribution information may store at lest the information containing the product identifier, the signer identifier, the receiver identifier, and the signature value as one unit, may store at least the verification key identifier additionally as one unit, may store at least the distribution information management module identifier additionally as one unit, may store at least the information containing the product identifier, the signer identifier, and the receiver identifier as one unit and have the signature value separately from the information for each unit, or may store at least the information containing the product identifier, the signer identifier, the receiver identifier, and verification key identifier as one unit and have the signature value corresponding to the verification key identifier for each verification key identifier.

In the present invention, the signature may be verified by use of only one of the distribution information processing module and the distribution information management module.

The distribution information processing module may be separated into a part for information reading and verification and a part for information storage and signature. Furthermore, the distribution information management module may be separated into a part for verification and a part for management of the signature key information and transmission to the distribution information processing module.

The present invention may be implemented in the form of embodiments or at least a part of the present invention may be implemented in the form of a computer program product.

BRIEF DESCRIPTION OF THE DRAWINGS

Preferred embodiments of the present invention will be described in detail based on the drawings:

FIG. 10 is a flowchart for describing the flow for signing in the third embodiment.

FIG. 13 is a flowchart for describing the flow for signature key information acquisition in the fifth embodiment.

FIG. 17 is a flowchart for describing the flow for verification in a distribution information verification unit of the seventh embodiment.

FIG. 22 is a flowchart for describing the flow for verification in the ninth embodiment of the present invention.

DETAILED DESCRIPTION OF THE
PREFERRED EMBODIMENTS

The present invention will be described in detail hereinafter with reference to examples.

First Embodiment

Figure 1:
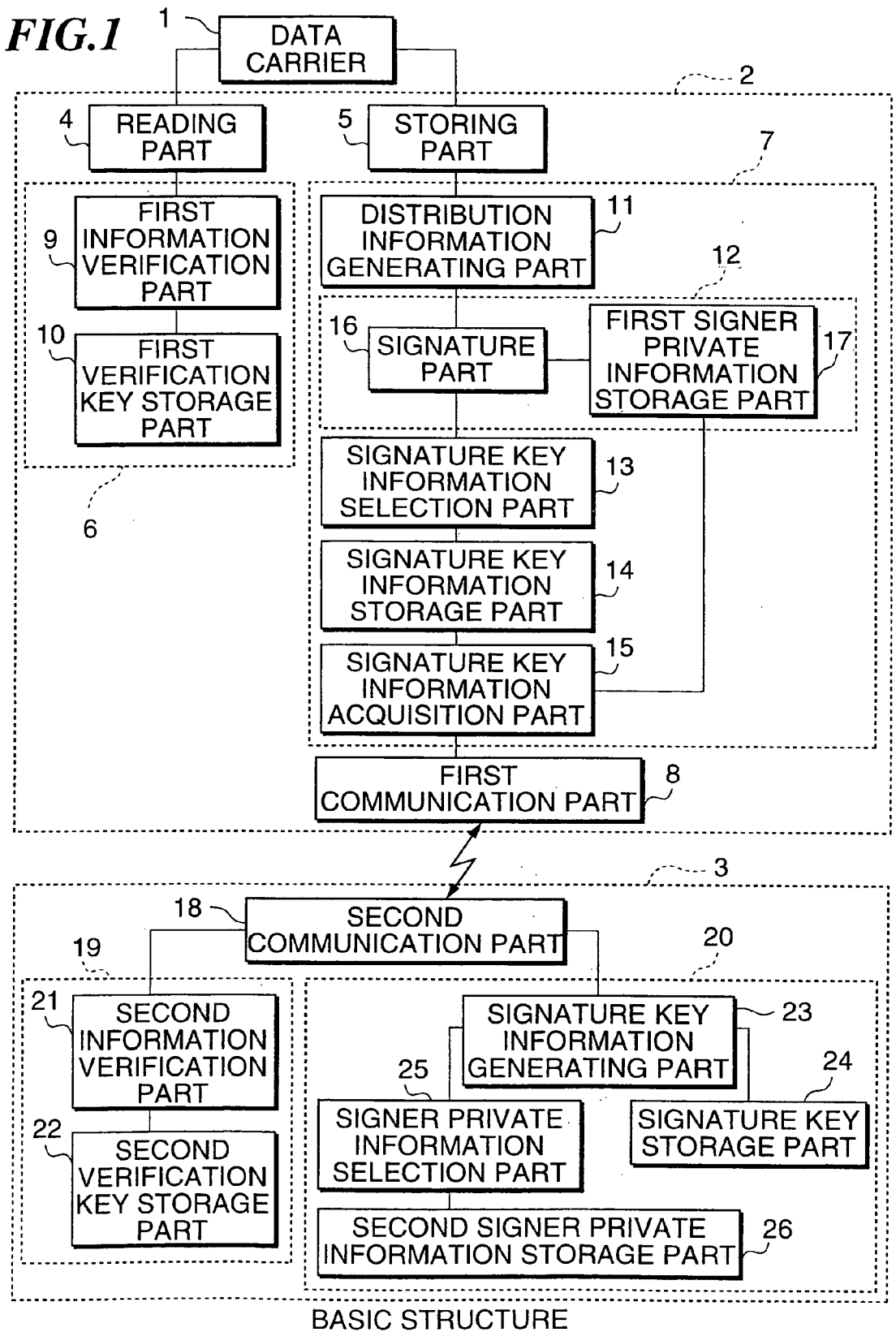
FIG. 1 is a block diagram for illustrating the basic structure of the present invention using the first embodiment of the present invention.

FIG. 1 shows the structure of the first example. In FIG. 1, a distribution management system of the present example have a data carrier 1 which is attached to a product for storing the information of the product, a distribution information processing module 2, and a distribution information management module 3 for managing the information of the product.

The distribution information processing module 2 have a reading part 4 for reading the data in the data carrier 1, a storing part 5 for storing the information in the data carrier 1, a first information verification unit 6 for verifying the information read out from the data carrier 1, an information generating unit 7 for processing the information to be stored in the data carrier 1, a first communication part 8 for communicating with the distribution information management module 3, and the first information verification unit 6 has a first information verification part 9 for verifying the information read out from the data carrier 1 and a first verification key storage part 10 for storing the verification key which is used by the first information verification part 9 for verification of the information. The information generating unit 7 has a distribution information generating part 11 for generating the information to be stored in the data carrier 1, a signature module 12 for performing the signature generating process, a signature key information selection part 13 for selecting the signature key information to be used for signature generation, a signature key information storage part 14 for storing the signature key information to be used for digital signature generation by a signature part 16 (the signature module 12), and a signature key information acquisition part 15 for acquiring the signature key information from the distribution information management module 3. The signature module 12 has the signature part 16 for generating a digital signature for the information generated by the distribution information generating part 11, and a first signer private information storage part 17 for storing the signer private information used by the signature part 16 for generating a digital signature.

The distribution information management module 3 has a second communication part 18 for communicating with the distribution information processing module 2, a second information verification unit 19 for processing the information received from the distribution information processing module 2, and a signature key information generating unit 20 for processing the signature key information to be sent to the distribution information processing module 2. The second information verification unit 19 has a second information verification part 21 for verifying the information received from the distribution information processing module 2, and a second verification key storage part 22 for storing the verification key used by the second information verification part 21 to verify the information. The signature key information generating unit 20 has a signature key information generating part 23 for generating the signature key information used by the distribution information processing module 2 for generating the distribution information, a signature key storage part 24 for storing the signature key used by the signature key information generating part 23 for generating the signature key information, a signer private information selection part 25 for selecting the signer private information used by the signature key information generating part 23 for generating the signature key information, and a second signer private information storage part 26 for storing the signer private information.

Figure 2:
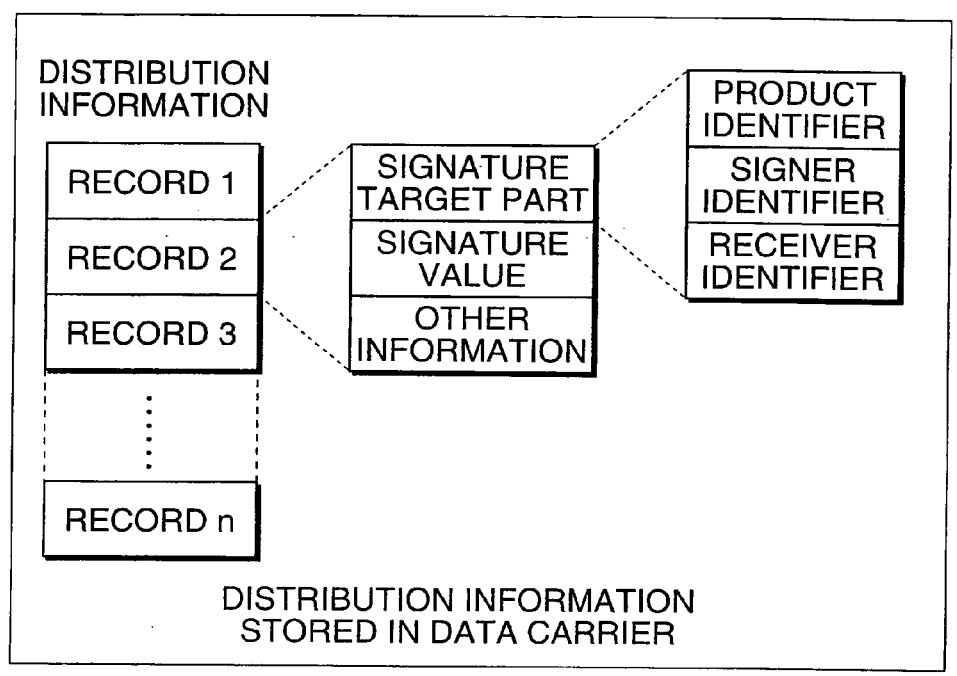
FIG. 2 is a diagram for illustrating the data structure of distribution information of the first embodiment.

FIG. 2 shows an example of the distribution information stored in the data carrier 1 in the present example. The data carrier 1 stores the distribution information in the form of a record including a signature target part, signature value, and other information as necessary, and the signature target part includes at least a product identifier, a signer identifier, and a receiver identifier.

Figure 3:
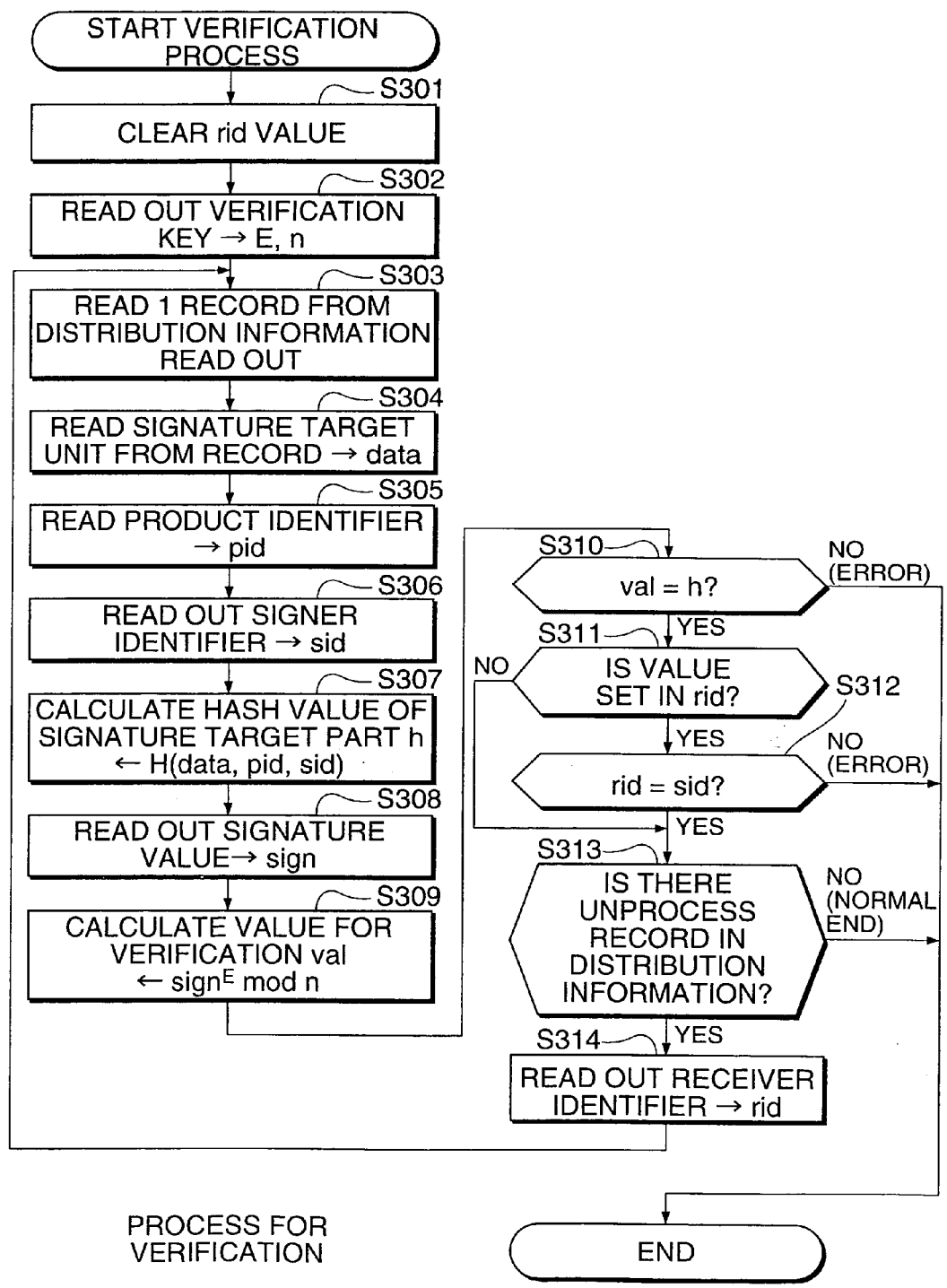
FIG. 3 is a flowchart for describing the flow for verification in the first embodiment.

FIG. 3 shows a flow of the distribution information verification process in the first information verification unit 6 performed when the distribution information read out from the data carrier 1 shown in FIG. 2 is processed.

In FIG. 3, upon receiving the distribution information read out from the data carrier 1 by the reading part 4, the first information verification part 9 clears the receiver identifier variable rid (step S301). The signature verification key is read out from the first signature verification key storage part 10, and set to the variable E and variable n (step S302). The first record is read out from the distribution information (step S303). The signature target part is read out from the read out record, and set to the variable data (step S304). The product identifier is read out from data and set to the variable pid (step S305). The signer identifier is read out from data and set to the variable sid (step S306). A hash value is calculated by means of the function H (data, pid, sid) and set to the variable h (step 5307). Herein, the hash function H ( ) is that hash function such as SHA-1, MD5 is applied to the returned value which the function F (data, pid, sid), for example, data|pid|sid (| represents the coupling of bit strings) returns a uniformed value from the argument data, pid, sid, and the function F( ) and hash function are not limited specifically. The signature part is read out from the record which has read out in Step S303, and set to the variable sign (step S308). A value for verification is calculated by use of the equation described hereunder, and set to the variable val (step S309).

$$\text{sign}^E \bmod n \text{ (mod is excess operation)} \qquad \text{[Equation 5]}$$

In step S309, RSA signature is used as signature algorithm. In the case where other signature algorithm is used in step S309, a key which is suitable for the algorithm is used as the key which is stored in the first signature verification key storage part 10 and read in step S308. In step S310, whether the hash value h calculated in step S307 is equal to the value val calculated in step S309 is checked. If the result is NO, then an error for indicating that the signature is erroneous is returned and the sequence is brought to an end, if the result is YES, then the sequence proceeds to step S311 (step S310). Whether a value is set to rid is checked (step S311), if a value is not set to rid, then the sequence proceeds to step S313, on the other hand if a value is set to rid, then rid is compared with the signer identifier sid read out in step S306 (step S312) if rid is not equal to sid, then an error for indicating that the record is discontinuous is returned and the sequence is brought to an end, on the other hand if the rid is equal to sid, then the sequence proceeds to step S313. Whether the record to be processed remains in the distribution information is checked (step S313), if the record does not remains, then the result for indicating that the verification is successful is returned and the sequence is brought to an end, on the other hand if the record remains, then receiver identifier is read out from the signature target part data which has been read out in step 304 and set to the variable rid (step S314), and the sequence returns to step S303 to process the next record.

In the present example, the signature is verified for each record read in step S303 by reaping the sequence from step S303 to step S314, however the signature may be verified by means of a method in which whether the equation described hereunder holds is tested using respective signature values s [1], s[2], . . . . s[m](m denotes the number of records) of the records, the hash value (calculation results in step S307) to respective signature target parts h[1], h[2], . . . . h[m] of the records, and the verification key E, n.

$$(s[1] \cdot s[2] \cdot \ldots \cdot s[m])^E = h[1] \cdot h[2] \cdot \ldots \cdot s[m] (\bmod n) \qquad \text{[Equation 6]}$$

Step S311 and step S312 may be performed immediately after step S306.

Figure 4B:
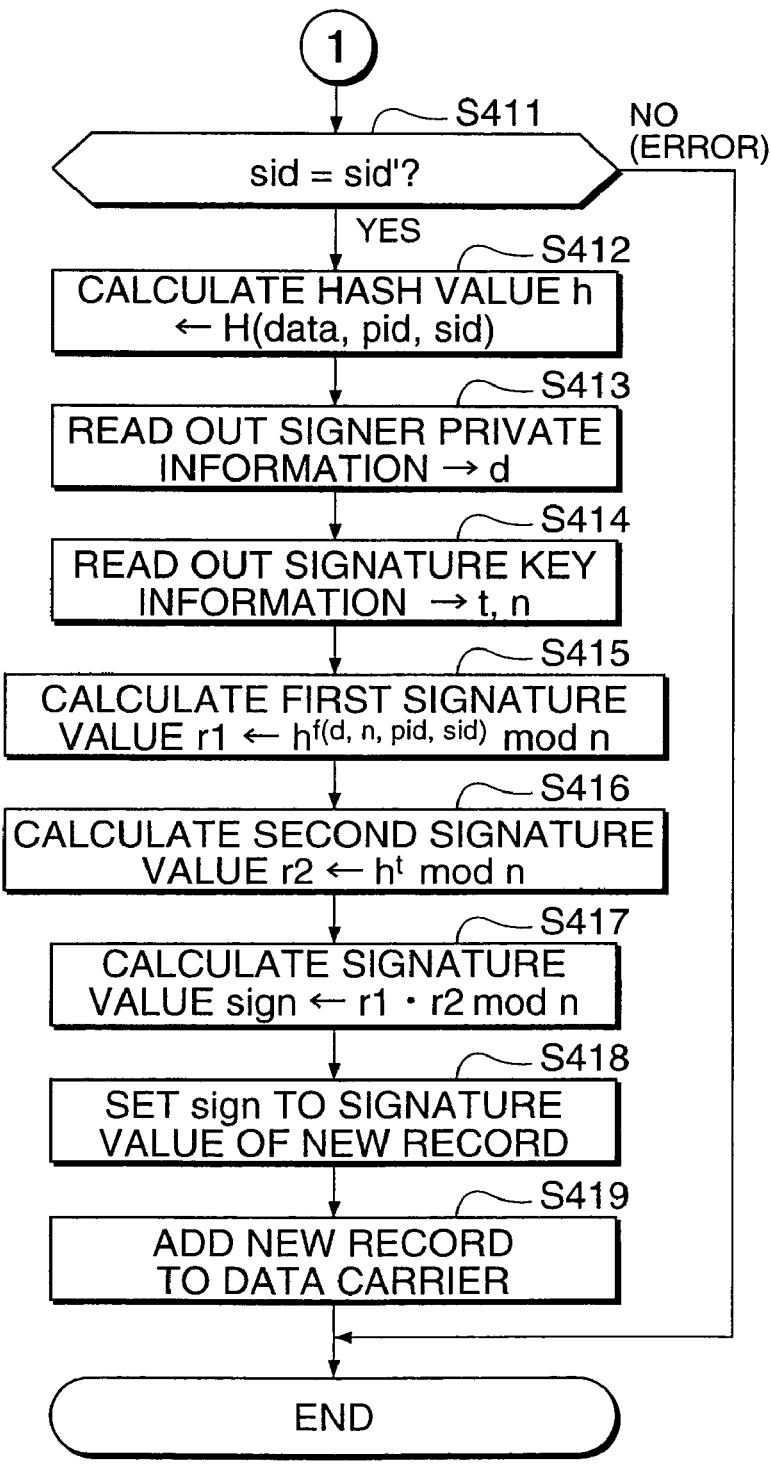
FIG. 4 is a flowchart for describing the flow for signing in the first embodiment.

FIG. 4 shows a process flow in the distribution information processing module 2 performed when a new record is added to the distribution information stored in the data carrier 1.

In FIG. 4, first the reading part 4 checks whether distribution information is stored in the data carrier (step S401), and if distribution information is not stored, then the distribution information generating part 11 sets the identifier of the product to which the data carrier is attached to the product identifier pid of a new record (step S402a), sets the identifier of the signer to the signer identifier sid of the new record (step S403a), and the sequence proceeds to step 407. The identifiers given in steps S402a and S403a may be given by means of any known method such as a method in which a user specifies the identifier each time, a method in which the identifier is read out from a suitable list, or a method in which the identifier embedded in advance is used.

If stored distribution information is found in step S401, the reading part 4 reads out the distribution information from the data carrier (step S402b), and reads out the last record from the distribution information read out (step S403b). The signature target part is read out from the read out record (step S404b), the product identifier is read out from the signature target part, and the product identifier is set to the product identifier pid of the new record (step S405). The receiver identifier is read out from the signature target part read out in step S404b, and set to the signer identifier sid of the new record (step S406b). After that, the sequence proceeds to step S407.

Then, the identifier of the destination of the product (receiver) is set to the receiver identifier rid of the new record in step S407. Values to be filled are set in other fields of the new record (step S408). Values to be set in steps S407 and S408 may be given by means of any known method such as a method in which a user specifies the identifier each time, a method in which the identifier is read out from a suitable list, or a method in which the identifier embedded in advance is used like the case of step S402a and S403a, the method for specifying the value is not limited. The signature target part of the new record prepared in the above-mentioned step is taken out, and set to the variable data (step S409). The signature part 16 takes out the signer identifier from the singer private information storage part 17, and sets it to sid' (step S410). The signer identifier sid of the new record and the signer identifier sid' read out from the signer private information storage part 17 sid' are compared each other (step S411), and if sid is not equal to sid' in step S411, then an error for indicating that the signer is erroneous is returned and the sequence is brought to an end, on the other hand if sid is equal to sid' in step S411, then the hash value is calculated by means of the function H (data, pid, sid) and set to the variable h (step S412). The function H (data, pid, sid) used here is the same as that used for calculation (step S307 shown in FIG. 3) of the hash value in the distribution information verification process. The signer private information is taken out from the first signer private information storage part 17, and set to the variable d (step S413). The signature key information selection part 13 takes out the signature key information corresponding to the product identifier pid from the signature key information storage part 15, and sets it to the variable t, n (step S414) The signature part 16 calculates the first signature value according to the equation described hereunder and sets it to the variable r1 (step S415).

$$h^{f(d,n,pid,sid)} \bmod n \qquad \text{[Equation 7]}$$

Herein, the function f ( ) is a one-way function which returns a uniform value from the argument d, n, pid, and sid from which values of d, n, pid, and sid cannot be derived. For example, this function is a function that a hash function such as SHA-1 or MD5 is applied to a value which is returned to d|n|pid|sid (| is coupling of bit strings), however the function is not limited to a such function. The distribution information generating part 11 calculates the second signature value according to the equation described hereunder (step S416).

$$h^t \bmod n \qquad \text{[Equation 8]}$$

The calculation results r1 and r2 obtained in step S415 and step S416 is used to calculate a signature value according to the equation described hereunder, and the signature value is set to the variable sign (step S417)

$$(r1 \cdot r2) \bmod n \qquad \text{[Equation 10]}$$

The signature value sign calculated in step S417 is set to the signature value of the new record (step S418). A new record to be added to the distribution information is generated through the above-mentioned series of processes, and the storing part 5 adds the new record in the distribution information of the data carrier 1 (step S419).

In the present example, the case in which the signature key information has been already stored in the signature key information storage part 15 is described, however the signature key information may be acquired by performing signature information acquisition process in advance, or may be acquired by performing signature information acquisition process when the signature key information is not found in step S413. In the sequence described hereinabove, the step S415 is performed by the signature part 16 and the step S416 is performed by the distribution information generating part 11, however the step S416 is also performed by the signature part 16, or the calculations in step 415 and step 416 are performed in parallel by the signature part 16 and the distribution information generating part 11 respectively.

Figure 5A:
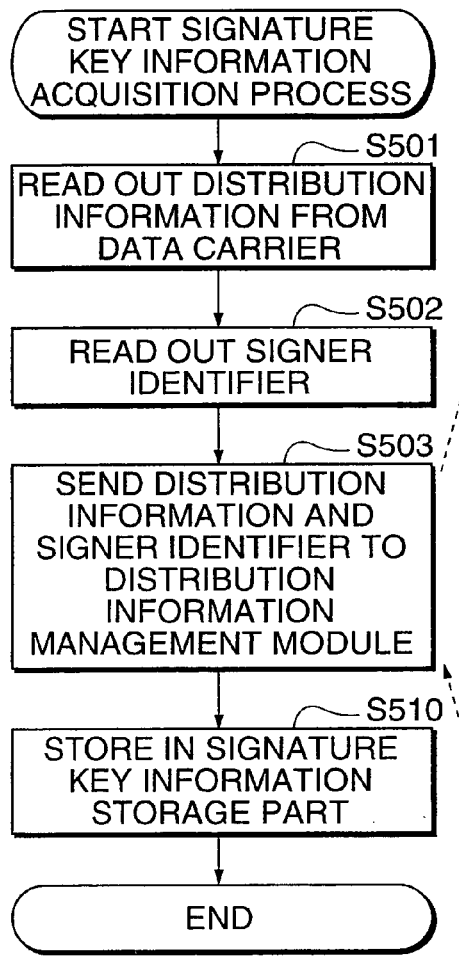
FIG. 5 is a flowchart for describing the flow for signature key information acquisition in the first embodiment.
Figure 5B:
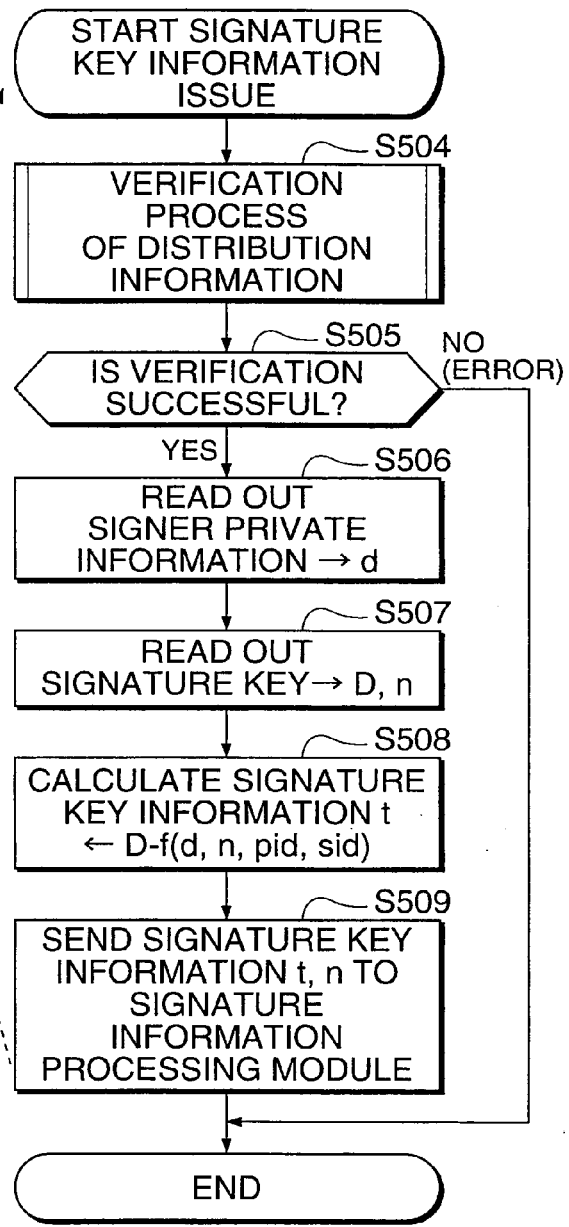

FIG. 5 shows a flow of a signature key information acquisition process. The signature key acquisition part 15 reads out distribution information from the data carrier 1 (step S501). A signer identifier is read out from the signer private information storage part 17 (step S502). The distribution information and the signature identifier are sent to the distribution information management module 3 through the first communication part 8 (step S503). The distribution information management module 3 sends the distribution information received by the second communication part 18 to the second distribution information verification part 19 for verification processing (step S504). The verification process is the same as the first distribution information verification process shown in FIG. 3. If the verification is not successful in step S504, then a message for indicating that the distribution information is not correct is sent to the distribution information processing module 2 through the second communication part 18 and the sequence is brought to an end, on the other hand if the verification is successful, then the signer private information selection part 25 reads out the signer private information corresponding to the signer identifier sid which is received by the second communication part 18 from the second signer private information storage part 26, and sets it to the variable d (step S505 and step S506). The signature key information generating part 23 reads out a signature key from the signature key storage part 24, and sets it to the variable D, n (step S507). The signer identifier sid, the product identifier pid read out during verification process in step S504, and the signature key read out in step S507 are used to calculate the equation described hereunder, and the result is set to the variable t (step S508).

$$D - f(d,n,pid,sid) \qquad \text{[Equation 11]}$$

Herein f ( ) is the same function as used in the signature generating process in step S415. t, n are sent to the distribution information processing module 2 (step S509) through the second communication part 18 as the signature key information. Upon receiving the signature key information through the first communication part 8, the signature key information acquisition part 15 stores it in the signature key information storage part 14 correspondingly to the product identifier (step S510). Herein, D is the private information corresponding to E used for signature verification performed by the distribution information verification part 6, and n is the public information which is used for verification together with E. In the case where RSA signature is used for signature Algorithm.

$$a^{E \cdot D} \bmod n = a \qquad \text{[Equation 12]}$$

holds.

The signature key information management module 3 may perform a process in which the pair of accepted product identifier and signer identifier is stored and the previous acceptance of the same pair of the product identifier and signer identifier is checked after the signature key information generating process is started, and signature key information is generated only for a new pair, otherwise may perform a process in which re-issue message is recorded in the record if the same pair has been already accepted. The record is traced for a certain product identifier to locate the product in the distribution flow and the record is traced for a specified signer identifier to check the stock of the signer.

The distribution information format is not limited to the type shown in FIG. 2, and various data structures may be employed. For example, a header information may be added to the format shown in FIG. 2. In other words, the verification key identifier may be added before the record 1. In the process in which the data structure shown in FIG. 2 is used, the verification key identifier is processed as a known verification key identifier, however by adding the header information, the verification key is added to each data carrier (tag). In this case, the verification key is read out by use of the verification key identifier included in the header information instead of step S302 (reading out of the verification key).

Second Embodiment

Figure 6:
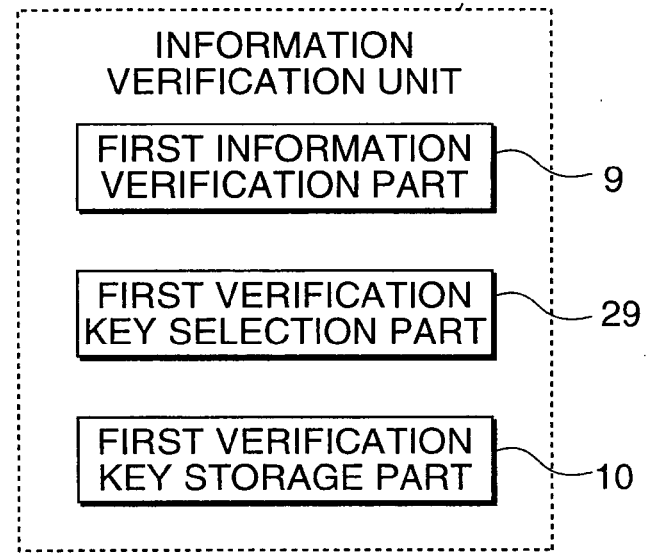
FIG. 6 is a block diagram for illustrating the structure of an information verification unit of the second embodiment of the present invention.

FIG. 6 shows another exemplary structure of the first distribution information verification unit 6. The first information verification unit has a first information verification part 9, a first verification key storage part 10, and a first verification key selection part 29.

Figure 7:
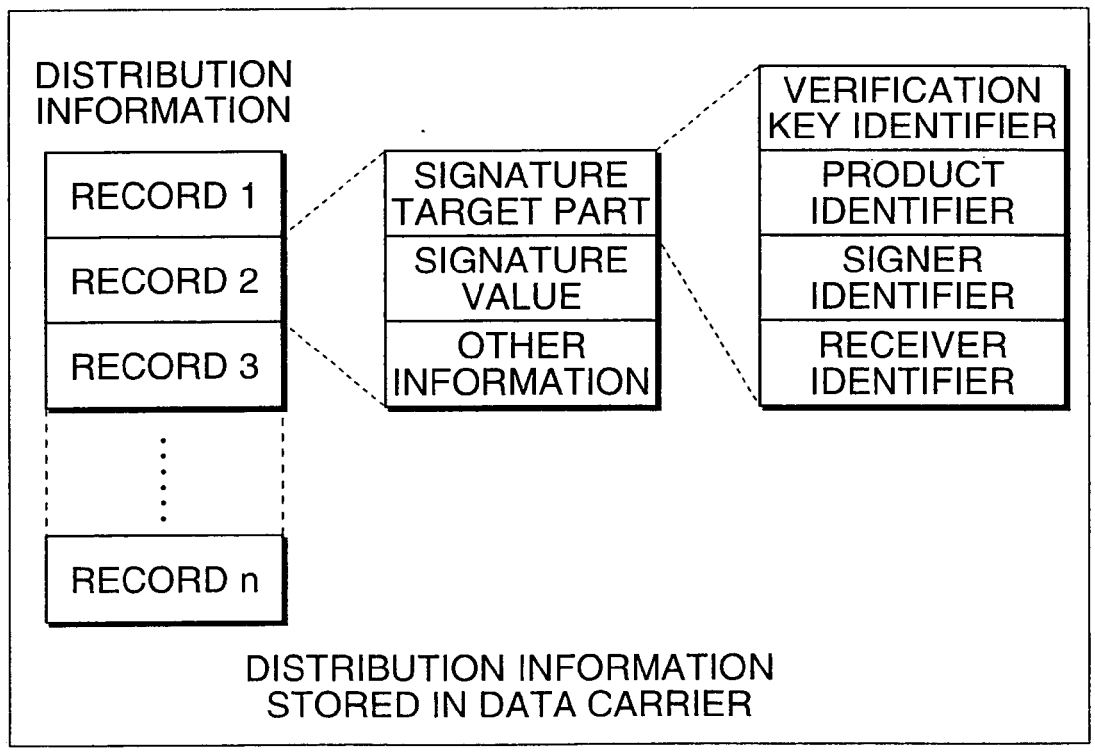
FIG. 7 is a diagram for describing the data structure of a distribution information used in the second embodiment.

FIG. 7 shows another exemplary distribution information to be stored in the data carrier 1. In the data carrier 1, the distribution information is stored in the form of a record including a signature target part, a signature value, and other information as required, and a signature target part includes at least a verification key identifier, product identifier, signer identifier, and receiver identifier.

Figure 8:
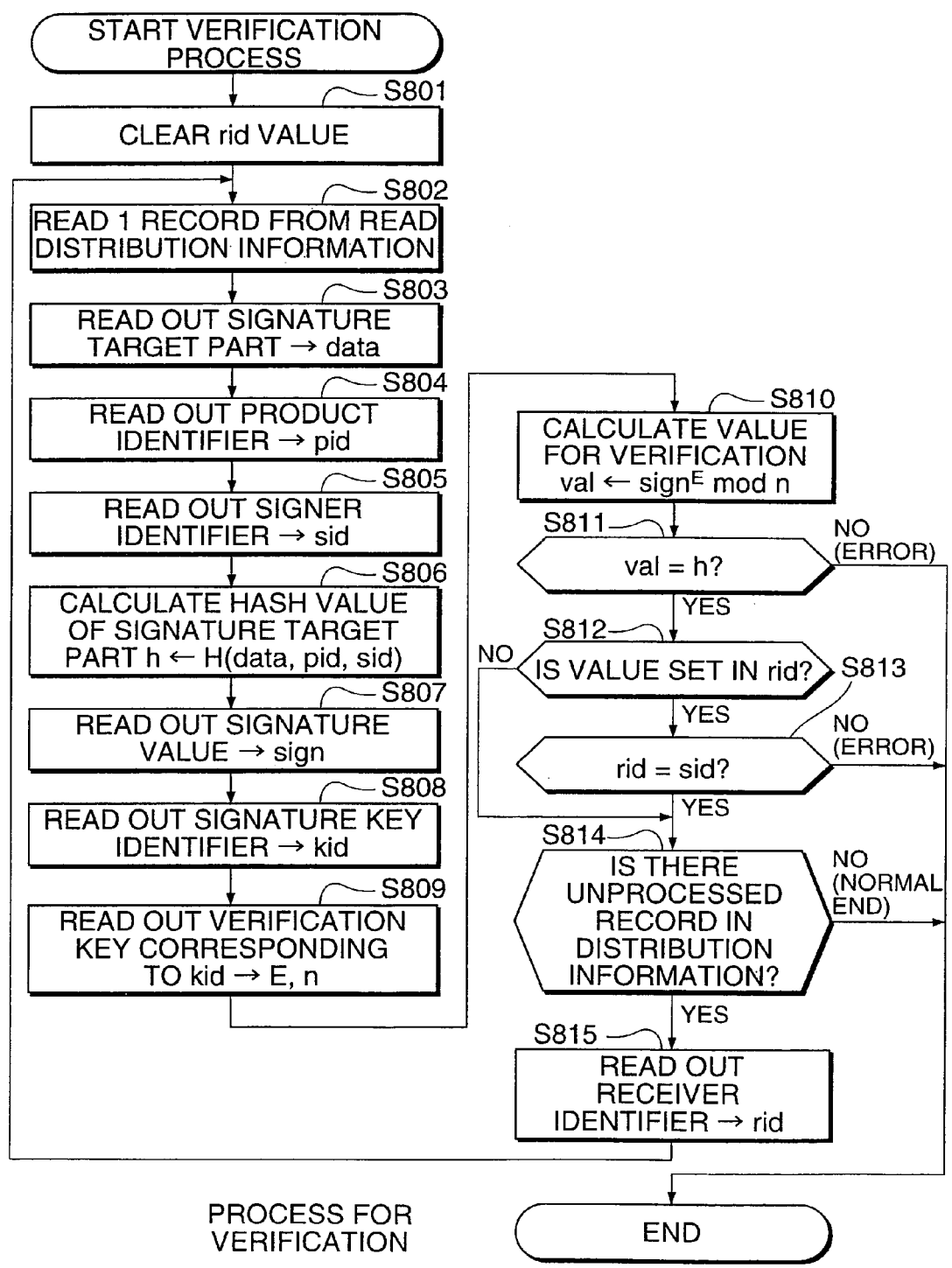
FIG. 8 is a flowchart for describing the flow for verification in the second embodiment.

FIG. 8 shows a flow for distribution information verification process performed in the first information verification unit 6 of the present example when a distribution information read out from the data carrier shown in FIG. 7 is processed.

In FIG. 8, upon receiving distribution information read out from the data carrier 1 by the reading part 4, the first information verification part 9 clears the receiver identifier variable rid (step S801). The first record is read out from the distribution information (step S802). A signature target part is read out from the read out record, and set to the variable data (stop S803). A product identifier is read out from data and set to the variable pid (step S804). A signer identifier is read out from the data and set to the variable sid (step S805). A hash value is calculated according the function H (data, pid, sid) and set to the variable h (step S806). Herein, the hash function ( ) is that hash function such as SHA-1, MD5 is applied to the returned value which the function F (data, pid, sid), for example, data|pid|sid (| represents the coupling of bit strings) returns a uniformed value from the argument data, pid, sid, and the function F( ) and hash function are not limited specifically. The signature part is read out from the record read out in step S802, and set to the variable sign (step S807). A verification key identifier is read out from the signature target part data read out in step S803 and set to the variable kid (step S808). The signature verification key corresponding to the verification key identifier kid is read out from the first signature verification key storage part 10 and set to the variable E and the variable n (step S809). A value for verification is calculated according the equation described hereunder and set to the variable val (step S810).

$$\text{sign}^E \bmod n \text{ (mod is excess operation)} \quad \text{[Equation 13]}$$

Herein, RSA signature is used as the signature algorithm in step S810. In the case where another signature algorithm is used in step S810, a key which is suitable for the algorithm, which key has been stored in the first signature verification key storage part 10 and is read in step S809, is used. Whether the hash value h calculated in step S806 is equal to the value val calculated in step S810 in checked. If the result is NO, then an error for indicating that the signature is erroneous is returned and the sequence is brought to an end, on the other hand if the result is YES, then the sequence proceeds to step S812 (step S811). Whether a value is set to rid is checked (step S812), and if a value is not set to rid, then the sequence proceeds to step S814, on the other hand if a value is set to rid, then the value is compared with the signer identifier sid r ad out in step S805. If rid is not equal to sid, then an error for indicating that the record is discontinuous is returned and the sequence is brought to an end, on the other hand if rid is equal to sid, then the sequence proceeds to step S814 (step S813). Whether the record to be processed remains in the distribution information is checked (step S814), and if the record does not remain, then a message for indicating that the verification is successful is returned and the sequence is brought to an end, on the other hand if the record remains, then a receiver identifier is read out from the signature target part data read out in step S803, and set to the variable rid (step S815), and the sequence returns to step S802 to process the next record.

Step S812 and step S813 may be performed before step S806.

Third Embodiment

Figure 9:
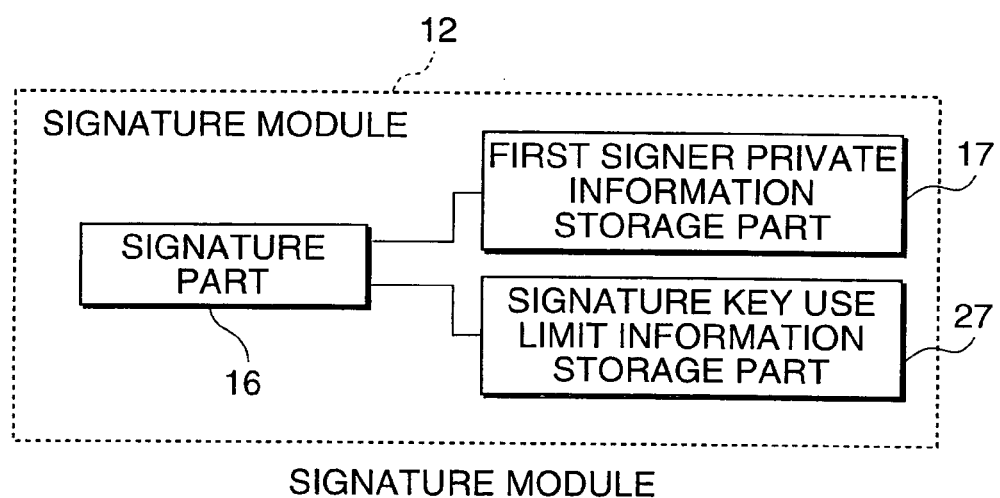
FIG. 9 is a block diagram for illustrating the structure of a signature module of the third embodiment of the present invention.

FIG. 9 shows another exemplary structure of the signature module 12. The signature module 12 has a signature part 16, a first signer private information storage part 17, and a signature key use limit storage part 27.

FIG. 10 shows a flow of the signature generation process in the present example. In FIG. 10, whether a distribution information is stored in the data carrier 1 is checked by the reading part 4 (step S1001), and if a stored distribution information is not found, then the distribution information generating part 11 sets a identifier of a product to which a data carrier is attached to the product identifier pid of a new record (step S1002a) and sets the identifier of a signer to the signer identifier sid of the new record (step S1003a), and the sequence proceeds to step S1007. The identifiers added in steps S1002a and S1003a are given by a known method such as a method in which the identifiers are read in from a suitable list, which is embedded in advance, specified by a user each time, and any method may be used. If a stored distribution information is found in step S1001, then the distribution information is read from the data carrier by the reading part 4 (step S1002b), and the last record is read out from the read distribution information (step S1003b). A signature target part is read out from the read record (step S1004b), a product identifier is read out from the signature target part and set to the product identifier pid of the new record (step S1005b). A receiver identifier is read out from the signature target part read in step S1004b, and set to the signer identifier sid of the new record (step S1006b).

Subsequently to step S1003a or step S1006b, an identifier of destination (receiver) of the product is set to the receiver identifier rid of the new record (step S1007). A suitable value is set to another field of the new record (step S1008). The values added in steps S1007 and S1008 are, in the same way as used in step S1002a and S1003a, given by a known method such as a method in which the identifiers are read in from a suitable list, which is embedded in advance, specified by a user each time, and any method may be used. The signature target part of the new record generated in the above-mentioned step is taken out, and set to the variable data (step S1009). The signature part 16 takes out the signer identifier from the signer private information storage part 17 and sets it to sid' (step S1010). The signer identifier sid of the new record is compared with the signer identifier sid' read out from the signer private information storage part 17 (step S1011), and if sid is not equal to sid' in step S1011, then an error indicating that the signer is erroneous is returned and the sequence is brought to an end. On the other hand if sid is equal to sid', then a signer key use limit information of the signature key information corresponding to the product identifier pid is read out from the signature key use limit information storage part 27 and set to the variable m (step S1012). If m is not a positive value, then an error for indicating that the this signature key has been used already limited number of times is returned and the sequence is brought to an end, on the other hand if m is a positive value, then the sequence proceeds to step S1014 (step S1013), and the value which is obtained by subtracting 1 from m is set to m (step S1014). The signature key use limit information stored in the signature key use limit information storage part 27 is updated to the value of the variable m (step S1015). A hash value H (data, pid, sid) is calculated based on the product identifier pid set in step S1002a or step S1005b, the signer identifier sid set in step S1003a or step S1006b, and the signature target part data set in step S1009, and set to the variable h (step S1016). Herein, the hash function H( ) is that hash function such as SHA-1, MD5 is applied to the returned value which the function F (data, pid, sid), for example, data|pid|sid (| represents the coupling of bit strings) returns a uniformed value from the argument data, pid, sid, and the function F( ) and hash function are not limited specifically. The signature part 16 reads out signer private information from the first singer signer private information storage part 17 and sets it to the variable d (step S1017). The signature key information selection part 13 reads out the signature key information corresponding to the product identifier pid from the signature key information storage part 14, and sets it to the variable t, n (step S1018). The signature part 16 calculates the first signature value according to the equation described hereunder and sets it to the variable r1 (step S1019).

$$h^{f(d,n,pid,sid)} \bmod n \quad \text{[Equation 14]}$$

Herein, the function f ( ) is a one-way function which returns a uniform value from the argument d, n, pid, and sid from which values of d, n, pid, and sid cannot be derived.

For example, the function is the function that a hash function such as SHA-1 or MD5 is applied to a value which is returned to d|n|pid|sid (| is coupling of bit strings), however the function is not limited to a such function. The distribution information generating part 11 calculates the second signature value according to the equation described hereunder and sets it to the variable r2 (step S1020).

$$h^t \bmod n \qquad \text{[Equation 15]}$$

The signature value is calculated according to the equation described hereunder by use of the calculation results r1 and r2 obtained in step S1019 and step S1020 and set to the variable sign (step S1021)

$$(r1-r2) \bmod n \qquad \text{[Equation 16]}$$

The signature value sign calculated in step S1021 is set to the signature value of the new record (step S1022), and the storing part 5 adds the new record generated in the above-mentioned step to the distribution information in the data carrier 1 (step S1023).

In the present example, the case in which the signature key information has been already stored in the signature key information storage part 15 is described, however the signature key information may be acquired in advance in the signature information acquiring process or may be acquired by performing signature information acquiring process when the signature key information is not found in step S1018. Furthermore, in the method described hereinabove, step S1019 is performed by the signature part 16 and step S1020 is performed by the distribution information generating part 11, however step S1020 is also performed by the signature part 16, otherwise step S1019 and step S1020 may be calculated in parallel by the signature part 16 and distribution information generating part 11 respectively.

Fourth Embodiment

Figure 11B:
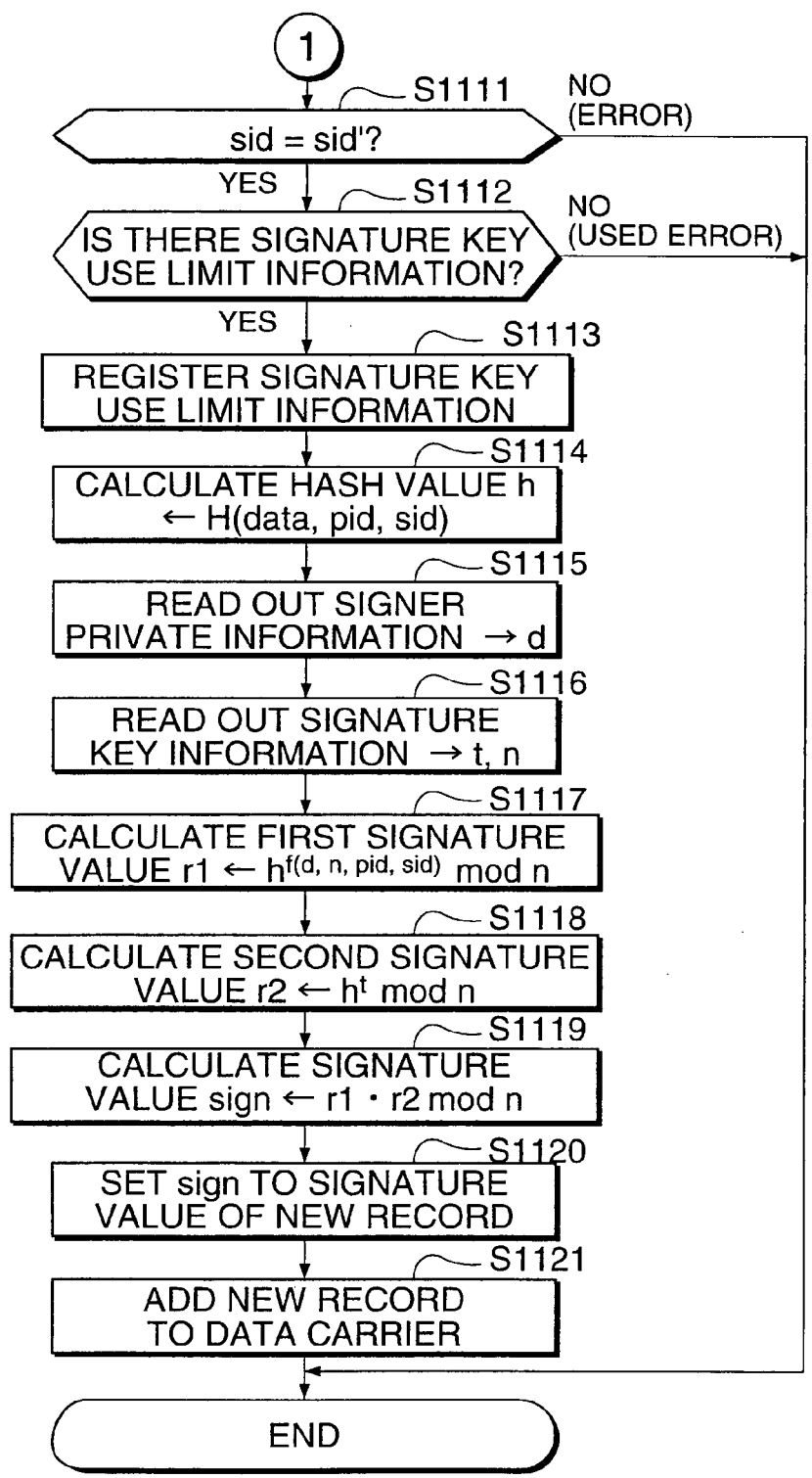
FIG. 11 is a flowchart for describing the flow for signing in a signature module in the fourth embodiment.

FIG. 11 shows an another example for describing a process flow of the signature module shown in FIG. 9. In FIG. 11, whether a distribution information stored in the data carrier 1 is found is checked by the reading part 4 (step S1101), and if a stored distribution information is not found, then the distribution information generating part 11 sets a identifier of a product to which a data carrier is attached to the product identifier pid of a new record (step S1102a) and sets the identifier of a signer to the signer identifier sid of the new record (step S1103a), and the sequence proceeds to step S1107. The identifiers added in steps S1102a and S1103a are given by a known method such as a method in which the identifiers are read in from a suitable list, which is embedded in advance, specified by a user each time, and any method may be used. If stored distribution information is found in step S1101, then the distribution information is read from the data carrier by the reading part 4 (step S1102b), and the last record is read out from the read distribution information (step 1103b). A signature target part is read out from the read record (step S1104b) and the product identifier is read out from the signature target part and set to the product identifier pid of a new record (step 1105b). A receiver identifier is read out from the signature target part read in step S1104b, and set to the signer identifier sid of the new record (step S1106b). An identifier of destination (receiver) of the product is set to the receiver identifier rid of the new record (step S1107). A suitable value is set to another field of the new record (step S1108). The values added in steps S1107 and S1108, in the same way as used in step S1102a and S1103a, are given by a known method such as a method in which the identifiers are read in from a suitable list, which is embedded in advance, specified by a user each time, and any method may be used. The signature target part of the new record generated in the above-mentioned step is taken out, and set to the variable data (step S1109). The signature part 16 takes out the signer identifier from the signer private information storage part 17 and sets it to sid' (step S1110). The signer identifier sid of the new record is compared with the singer identifier sid' read out from the signer private information storage part 17 (step S1111), and if sid is not equal to sid' in step S1111, then an error for indicating that the signer is erroneous is returned and the sequence is brought to an end, on the other hand if sid is equal to sid', then the existence of the signature key use limit information of the signature key information corresponding to the product identifier pid in the signature key use limit information storage part 27 is checked (step S1112). If the signature key use limit information is found, then an error for indicating that this key is already used is returned and the sequence is brought to an end, on the other hand if the signature key use limit information is not found, then the sequence proceeds to step S1113, and the signature key use limit information is registered in the signature key use limit information storage part 27 correspondingly to the product identifier (step S1113) A hash value H (data, pid, sid) is calculated based on the product identifier pid set in step S1102a or step S1105b, the signer identifier pid set in step S1103a or step S1106b, and the signature target part data set in step S1109, and set to the variable h (step S1114). Herein, the hash function H( ) is that hash function such as SHA-1, MD5 is applied to the returned value which the function F (data, pid, sid), for example, data|pid|sid (| represents the coupling of bit strings) returns a uniformed value from the argument data, pid, sid, and the function F( ) and hash function are not limited specifically. The signature part 16 reads out a signer private information from the first singer private information storage part 17 and sets it to the variable d (step S1115). The signature key information selection part 13 reads out the signature key information corresponding to the product identifier pid from the signature key information storage part 14, and sets it to the variable t, n (step S1116). The signature part 16 calculates the first signature value according to the equation described hereunder and sets it to the variable r1 (step S1117).

$$h^{f(d,n,pid,sid)} \bmod n \qquad \text{[Equation 17]}$$

Herein, the function f ( ) is a one-way function which returns a uniform value from the argument d, n, pid, and sid from which values of d, n, pid, and sid cannot be derived. For example, this function is a function that a hash function such as SHA-1 or MD5 is applied to a value which is returned to d|n|pid|sid (| is coupling of bit strings), however the function is not limited to a such function. The distribution information generating part 11 calculates the second signature value according to the equation described hereunder and sets it to the variable r2 (step S1118).

$$h^t \bmod n \qquad \text{[Equation 18]}$$

The signature value is calculated according to the equation described hereunder by use of the calculation results r1 and r2 obtained in step S1117 and step S1118 and set to the variable sign (step S1119)

$$(r1-r2) \bmod n \qquad \text{[Equation 19]}$$

The signature value sign calculated in step S1119 is set to the signature value of the new record (step S1120), and the storing part 5 adds the new record generated in the above-mentioned step to the distribution information in the data carrier 1 (step S121). In the present example, the case in which the signature key information has been already stored in the signature key information storage part 15 is described, however the signature key information may be acquired in advance in the signature information acquiring process or may be acquired by performing signature information acquiring process when the signature key information is not found in step S1116.

Furthermore, in the method described hereinabove, step S1117 is performed by the signature part 16 and step S1118 is performed by the distribution information generating part 11, however step S1118 is also performed by the signature part 16, otherwise step S1117 and step S1118 may be calculated in parallel by the signature part 16 and distribution information generating part 11 respectively.

Fifth Embodiment

Figure 12:
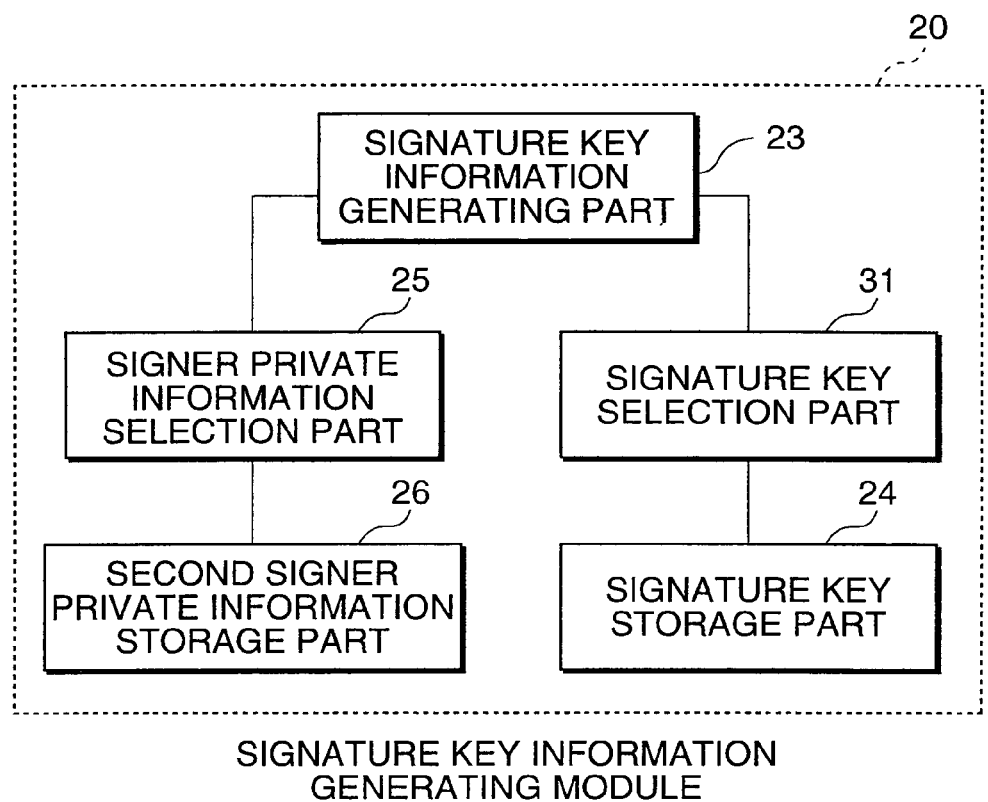

FIG. 12 shows another exemplary structure of the signature key information generating unit 20. The signature key information generating unit 20 has a signature key information generating part 23, a signer private information selection part 25, a second signer private key information storage part 26, a signature key storage part 24, and a signature key selection part 31.

Figure 13A:
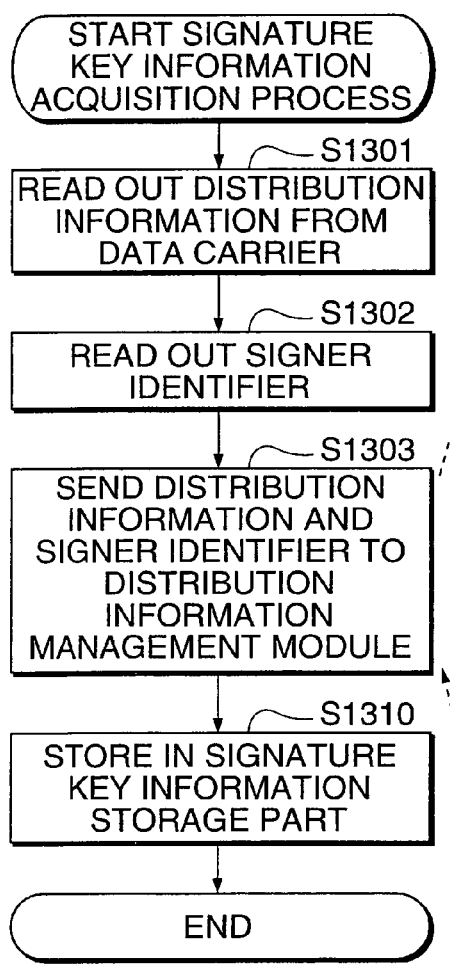
FIG. 13 is a block diagram for illustrating the structure of a signature key information generating module of the fifth embodiment of the present invention.
Figure 13B:
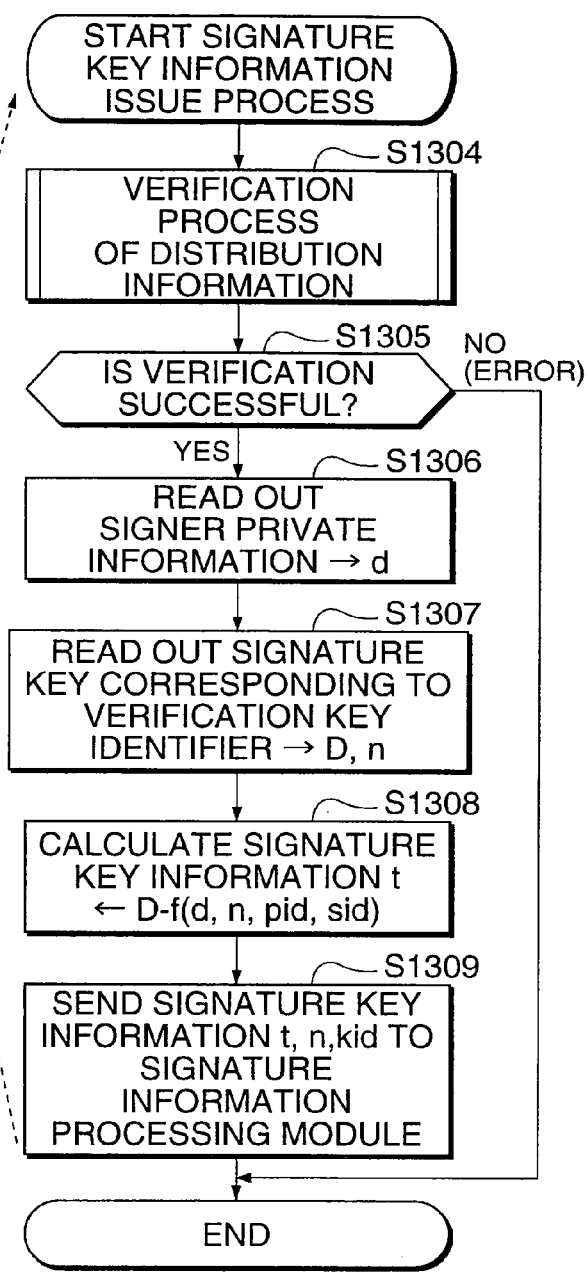

FIG. 13 shows a flow of a signature key information acquisition process. In FIG. 13, the signature key acquisition part 15 reads out a distribution information from the data carrier 1 (step S1301). A signer identifier is read out from the signer private information storage part 17 (step S1302). The distribution information and the signature identifier are sent to the distribution information management module 3 through the first communication part 8 (step S1303). The distribution information management module 3 sends the distribution information received by the second communication part 18 to the second distribution information verification part 19 for verification processing (step S1304). The verification process is the same as the distribution information verification process shown in FIG. 8. If the verification is not successful in step S1304, then a message for indicating that the distribution information is not correct is sent to the distribution information processing module 2 through the second communication part 18 and the sequence is brought to an end, on the other hand if the verification is successful, then the signer private information selection part 25 reads out the signer private information corresponding to the signer identifier sid which is received by the second communication part 18 from the second signer private information storage part 26, and sets it to the variable d (step S1305 and step S1306). The signature key information generating part 23 reads out a signature key from the signature key storage part, and sets it to the variable D, n (step S1307). The signer identifier sid, the product identifier pid read out during verification process in Step S1304, and the signature key read out in step S1307 are used to calculate the equation described hereunder, and the result is set to the variable t (step S1308).

D=f(d,n,pid,sid)  [Equation 20]

Herein f ( ) is the same function as used in the signature generating process (step S1019 in FIG. 10 and step S1117 in FIG. 11). t, n, kid are sent to the distribution information processing module 3 (step S1309) through the second transmission part 18 as the signature key information. Upon receiving the signature key information through the first communication part 8, the signature key information acquisition part 15 stores it in the signature key information storage part 14 correspondingly to the product identifier (step S1310). Herein, D is the private information corresponding to E used for signature verification performed by the distribution information verification part 6, and n is the public information which is used for verification together with E. In the case where RSA signature is used for signature Algorithm, $$a^{E \cdot D} \mod n = a$$  [Equation 21]

holds.

Sixth Embodiment

Figure 14:
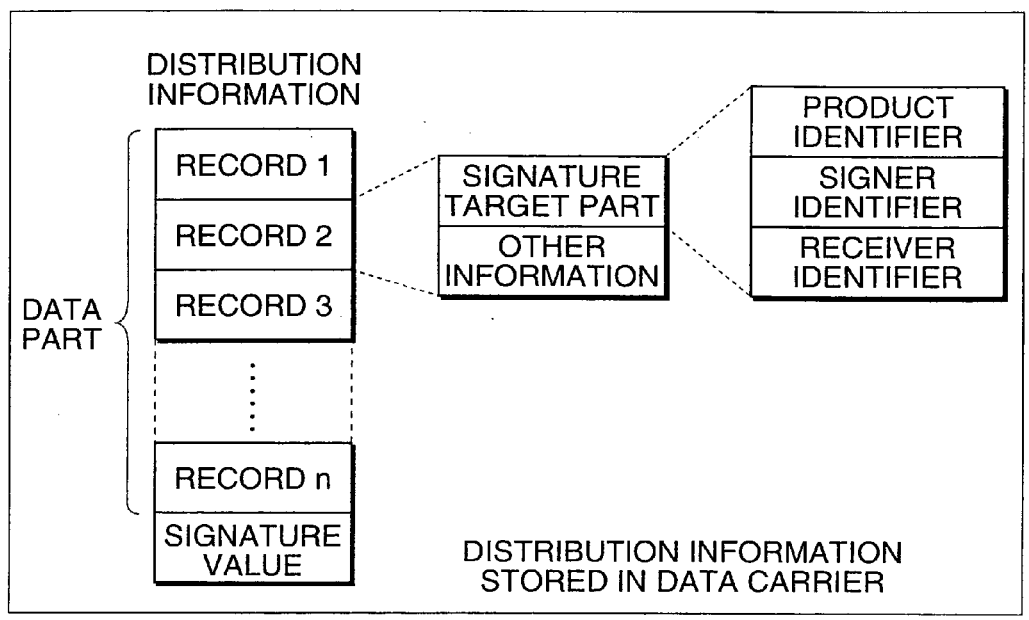
FIG. 14 is a diagram for illustrating the data structure of a distribution information used in the sixth embodiment of the present invention.

FIG. 14 is an example of the distribution information to be stored in the data carrier 1. In the data carrier 1, the distribution information has a data part including plural records and a signature value, each record has a signature target part and other information as required, and each signature target part includes at least a product identifier, a signer identifier, and a receiver identifier.

Figure 15A:
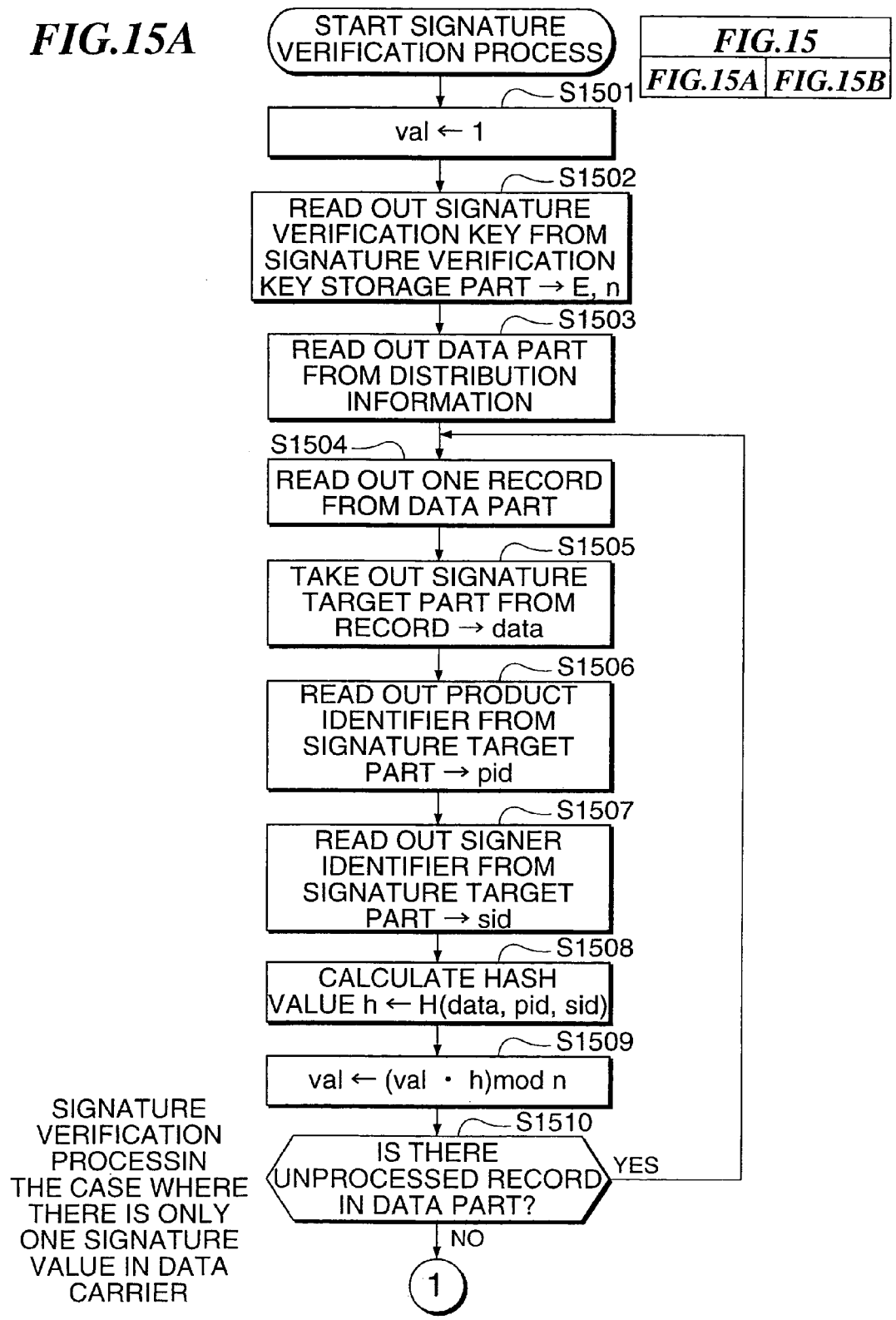
FIG. 15 is a flowchart for describing the flow for verification in the sixth embodiment.
Figure 15B:
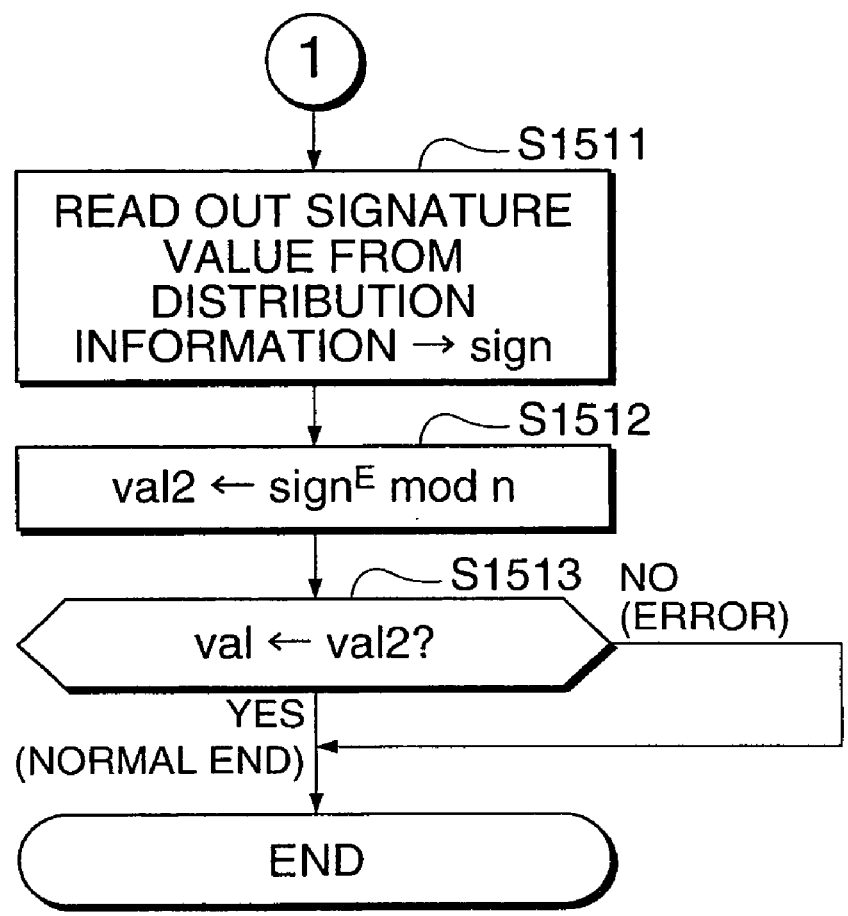

FIG. 15 shows a flow of a verification process performed by the distribution information verification unit 6 to verify the distribution information shown in FIG. 14. In FIG. 15, when distribution information read from the data carrier is given, the variable val is initialized (1 is set in step S1501), and a signature verification key is read out from the first verification key storage part 10 and set to the variable E, n (step S1502). The data part is read out from the distribution information (step S1503). One record is read out from the read data part (step S1503). A signature target part is taken out from the read out record and set to the variable data (step S1505) A product identifier is read out from the signature target part and set to the variable pid (step S1506), and a signer identifier is taken out from the signature target part and set to the variable sid (step S1507). A hash value H (data, pid, sid) is calculated by use of the signature target part data read out in step S1505, the product identifier pid read out in step S1506, and the signer identifier sid read out in step S1507, and set to the variable h (step S1508). Herein, the hash function H( ) is that hash function ouch as SHA-1, MD5 is applied to the returned value which the function F (data, pid, sid), for example, data |pid|sid (| represents the coupling of bit strings) returns a uniformed value from the argument data, pid, sid, and the function F( ) and hash function are not limited specifically. The equation described hereunder is calculated and set to the variable val (step S1509).

(val=h)mod n  [Equation 22]

Whether an unprocessed record remains in the data part read out in step S1503 is checked (step S1510), if an unprocessed record remains, then the sequence returns to step S1504 and the next record is processed. If an unprocessed record does not remain, then the signature value is read out from the distribution information and set to the variable sign (step S1511). A verification value is calculated according to the equation described hereunder by use of the verification key E, n read out in step S1502 and the signature value sign read out in step S1511 and set to the variable val2 (step S1512).

$$\text{sign}^E \mod n$$  [Equation 23]

The value of the variable val and the value of the variable val2 are compared (step S1513), and if both values are equal, then a message for indicating that the verification is successful is return d and the sequence is brought to an end, an the other hand if both values are not equal each other, then a message for indicating that the verification is not successful is returned and the sequence is brought to an end.

Figure 16B:
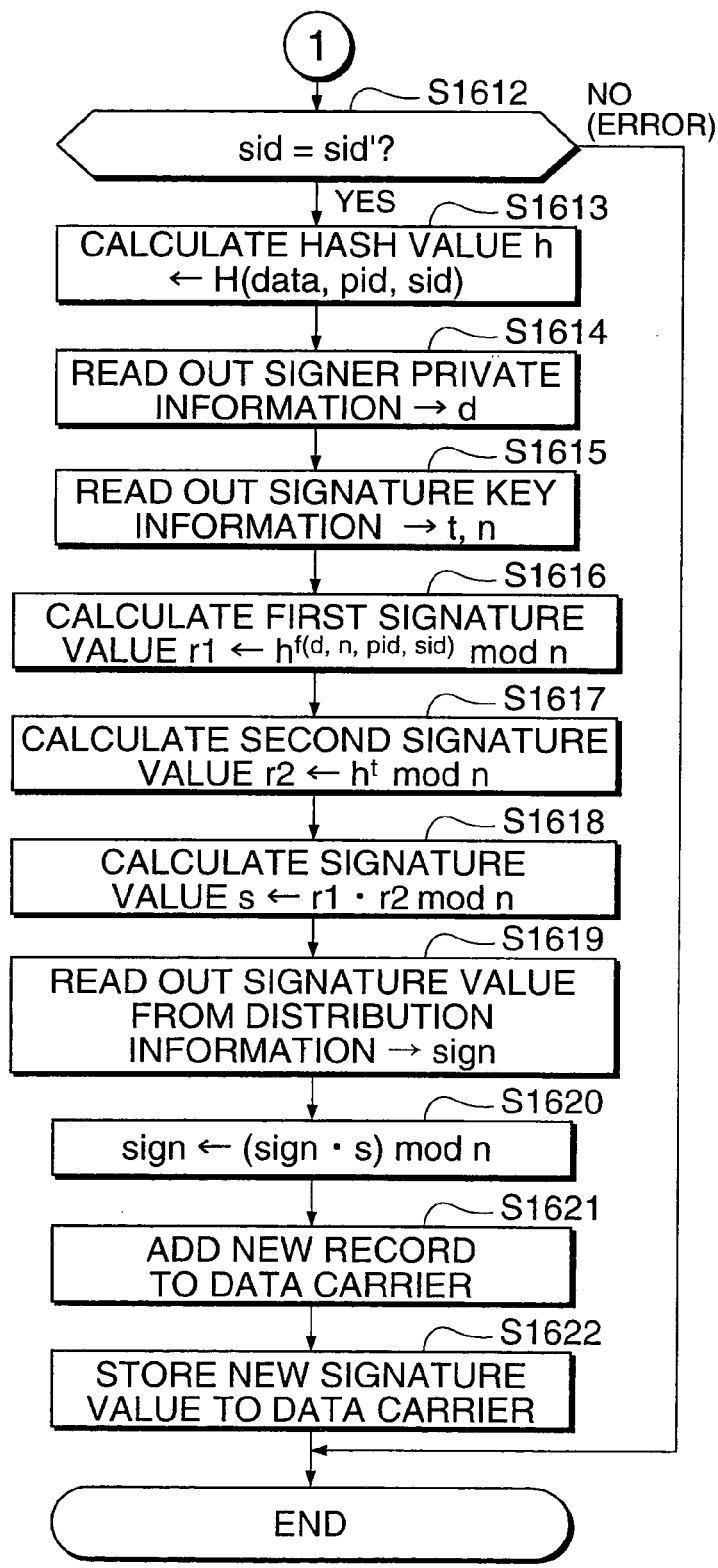
FIG. 16 is a flowchart for describing the flow for signing in the sixth embodiment.

FIG. 16 shows a flow performed by the distribution information generating unit 6 to generate the distribution information shown in FIG. 14. Whether distribution information stored in the data carrier 1 is found is checked by the reading part 4 (step S1601), and if stored distribution information is not found, then the distribution information generating part 11 sets an identifier of a product to which a data carrier is attached to the product identifier pid of a new record (step S1602a) and sets the identifier of a signer to the signer identifier sid of the new record (step S1603a), and the sequence proceeds to step S1608. The identifiers added in steps S1602a and S1603a are given by a known method such as a method in which the identifiers are read in from a suitable list, which is embedded in advance, specified by a user each time, and any method may be used. If a stored distribution information is found in step S1601, then the distribution information is read from the data carrier by the reading part 4 (step S1602b), a data part is readout from the read distribution information (step S1603b). The last record is readout from the read data part (step S1604b), and a signature target part is read out from the read out record (step S1605b). A product identifier is read out from the signature target part and set to the product identifier pid of the new record (step S1606b). A receiver identifier is r ad out from the signature target part read in step S1604b, and set to the signer identifier sid of the new record (step S1607b). An identifier of destination (receiver) of the product is set to the receiver identifier rid of the new record (step S1605). A suitable value is set to another field of the new record (step S1609). The signature target part is taken out from the new record, and set to the variable data (step S1610). The signature part 16 takes out the signer identifier from the signer private information storage part 17 and sets it to sid' (step S1611). The signer identifier sid of the new record is compared with the singer identifier sid read out from the signer private information storage part 17 (step S1612), and if sid is not equal to sid' in step S1611, then an error for indicating that the signer is erroneous is returned and the sequence is brought to an end, on the other hand if sid is equal to sid', a hash value H (data, pid, sid) is calculated based on the product identifier pid set in step S1602a or step S1606b, the signer identifier sid set in step S1603a or step S1607b, and the signature target part data set in step S1610, and set to the variable h (step S1613). Herein the hash function H ( ) is the same as the hash function used for the verification process (step S1508 in FIG. 15) performed by the distribution information verification unit 6. The signature part 16 reads out signer private information from the first singer private information storage part 17 and sets it to the variable d (step S1614). The signature key information selection part 13 reads out the signature key information corresponding to the pr duct identifier pid from the signature key information storage part 14, and sets it to the variable t, n (step S1615). The signature part 16 calculates the first signature value according to the equation described hereunder and sets it to the variable r1 (step S1616).

$$h^{f(d,n,pid,sid)} \bmod n \quad \text{[Equation 24]}$$

Herein, the function f ( ) is a one-way function which returns a uniform value from the argument d, n, pid, and sid from which values of d, n, pid, and sid cannot be derived. For example, this function is a function that a hash function such as SHA-1 or MD5 is applied to a value which is returned to d|n|pid|sid (| is coupling of bit strings), however the function is not limited to a such function. The distribution information generating part 11 calculates the second signature value according to the equation described hereunder and sets it to the variable r2 (step S1617).

$$h^e \bmod n \quad \text{[Equation 25]}$$

The signature value is calculated according to the equation described hereunder by use of the calculation results r1 and r2 obtained in step S1616 and step S1617 and set to the variable s (step S1619)

$$(r1-r2) \bmod n \quad \text{[Equation 26]}$$

The signature part is read out from the distribution information read out in step S1602b and set to the variable sign (step S1619). The equation described hereunder is calculated by use of n read out in step S1615, s calculated in step S1618, and sign read out in step S1619, and set to the variable sign (step S1620).

$$(\text{sign} \cdot s) \bmod n \quad \text{[Equation 27]}$$

The new record generated in the above-mentioned step is added to the data part of the data carrier 1 (step S1621) and the signature value of the data carrier 1 is updated with the value of the variable sign calculated in step S1620 (step S1622).

In the present example, the case in which the signature key information has been already stored in the signature key information storage part 15 is described, however the signature key information may be acquired in advance in the signature information acquiring process or may be acquired by performing signature information acquiring process when the signature key information is not found in step S1615. Furthermore, in the method described hereinabove, step S1616 is performed by the signature part 16 and step S1617 is performed by the distribution information generating part 11, however step S1617 is also performed by the signature part 16, otherwise step S1616 and step S1617 may be calculated in parallel by the signature part 16 and distribution information generating part 11 respectively.

Seventh Embodiment

FIG. 17 shows a flow of a verification process performed by the distribution information unit 6 to verify the distribution information shown in FIG. 14. In FIG. 17, distribution information is read out from the data carrier 1 by the reading part 4 (step S1701), the data part is read out from the read distribution information (step S1702), and the variables rid, data are cleared (step S1703). One record is read out (step S1704) from the data part read out in step S1702, and a signature target part is read out from the read out record and set to the variable d (step S1705). A signer identifier is read out from the signature target part read out in step S1705 and set to the variable sid (step S1706). Whether a value set to the variable rid is found is checked (step S1707), and if a value to the variable sid is not found, then the sequence proceeds to step S1709, on the other hand if a value is found, then the signer identifier sid read in step S1706 is compared with rid (step S1708). If sid is not equal to rid, then a message for indicating that the record is discontinuous is returned and the sequence is brought to an end, on the other hand if sid is equal to rid, then the sequence proceeds to step S1709. The equation described hereunder is calculated by use of the value of the signature target part d read out in step S1705 and the value of the variable data and set to the variable data (step S1709).

$$\text{data}|d \quad \text{(| is coupling of bit strings. If data is cleared, then d is returned)} \quad \text{[Equation 28]}$$

Other methods may be used for the calculation in step S1709 as long as the result obtained by use of data and d is one-to-one corresponding to a pair of data and d. Whether an unprocessed record remains in the data part read in step S1702 is checked (step S1710), and if an unprocessed record remains, then a receiver identifier is read out from the signature target part read out in step S1705 and set to the variable rid (step S1711), and the sequence returns to step S1704, the next unprocessed record is processed, if an unprocessed record is not found, then the sequence proceeds to step S1712. A product identifier is read out from the signature target part d read out in step S1705 and set to the variable pid (step S1712). A hash value H (data, pid, sid) is calculated by use of the variable data calculated in the above-mentioned step, the signer identifier sid read out in step S1706, and the product identifier pid read out in step S1712, and set to the variable h (step S1713). Herein, the hash function H( ) is that hash function such as SHA-1, NDS is applied to the returned value which the function F (data, pid, sid), for example, data|pid|sid (| represents the coupling of bit strings) returns a uniformed value from the argument data, pid, sid, and the function F( ) and hash function are not limited specifically. A signature value is read out from the distribution information read out in step S1701 is set to the variable sign (step S1714). A signature verification key is read out from the first verification key storage part 10, and set to the variable E, n (step S1715). A value for verification is calculated according to the equation described hereunder by use of the signature value sign read out in step S1714 and the signature verification key E, n read out in step S1715 and set to the variable val (step S1716)

$$\text{sign}^E \bmod n \quad \text{[Equation 29]}$$

The hash value h calculated in step S1713 in compared with the value val for verification calculated in step S1716 (step S1717). If h is equal to val, then a message for indicating that the verification is successful is returned and the sequence is brought to an end, on the other hand if h is not equal to val, then a message for indicating that the verification is not successful is returned and the sequence is brought to an end.

Figure 18B:
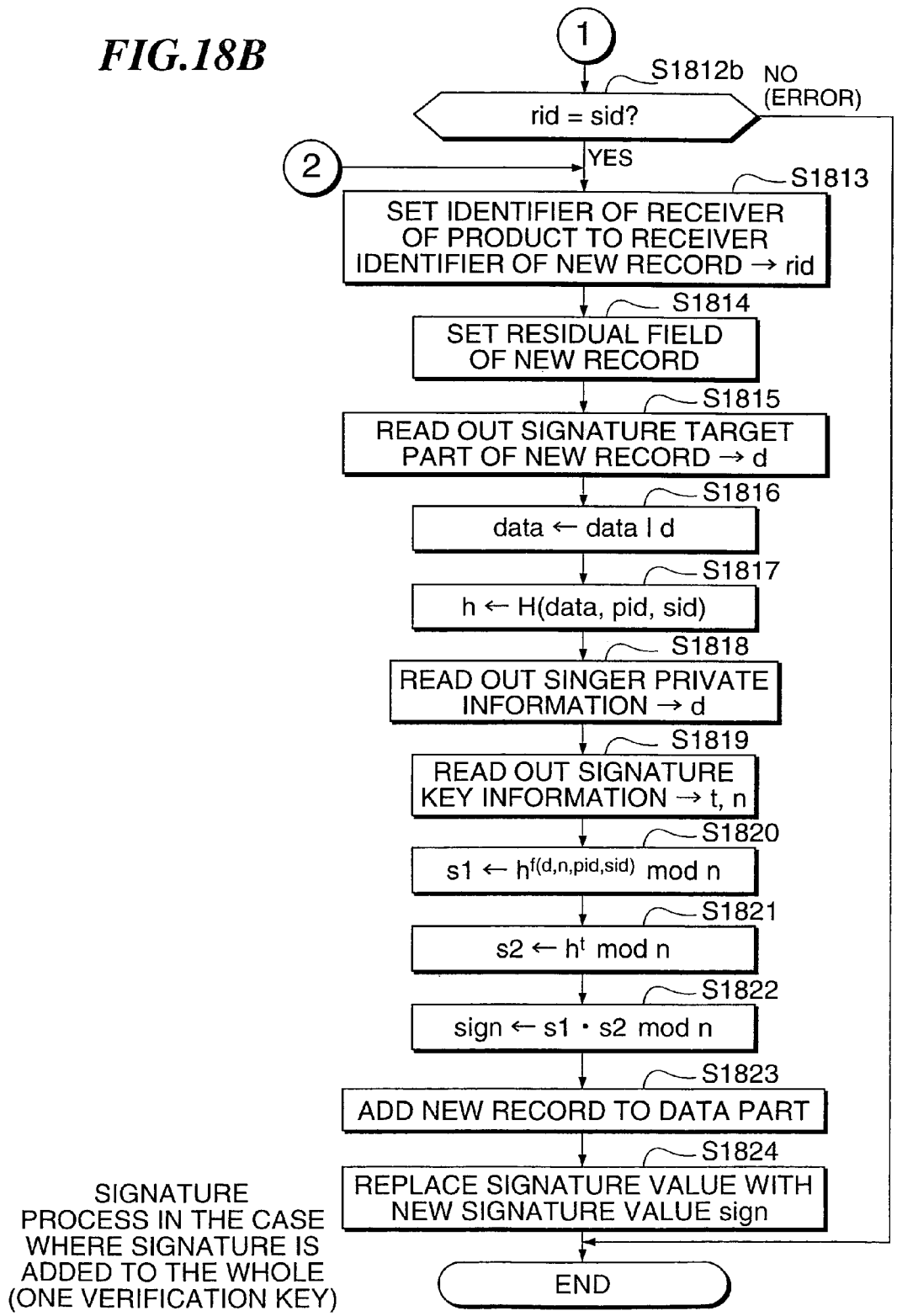
FIG. 18 is a flowchart for describing the flow for signing in the seventh embodiment.

FIG. 18 shows a flow of a process performed by the distribution information generating unit 7 to generate the distribution information shown in FIG. 14. In FIG. 18, the variable data is initialized (step S1801), whether distribution information is found in the data carrier 1 (step S1802) is checked, and if a distribution information is not found, then a product identifier pid of a new record to be stored in the data part of the distribution information is set (step S1803a) and a signer identifier pid of a new record is set (step S1804a) and the sequence proceeds to step S1813. If a distribution information is found in step S1802, then the distribution information is read out from the data carrier 1 through the reading part 4 (step S1803b), a data part is taken out from the distribution information read out (step S1804b), and one record is taken out from the data part (step S1805b) A signature target part of the taken out record is taken out and set to the variable data (step S1806). The equation described hereunder is calculated from the variable data and the signature target part d taken out in step S1806b, and set to the variable data (step S1807b)

$$\text{data}|d \quad \text{(| is coupling of bit strings. If data is cleared, then d is returned)} \quad \text{[Equation 30]}$$

Other methods may be used for calculation in step S1807b as long as the calculation is the same as the verification calculation (step S1709 shown in FIG. 17) performed by the distribution information verification unit 6. Whether an unprocessed record remains in the data part read out in step S1804b is checked (step S1808b), and if an unprocessed record does not remain, the sequence proceeds to step S1809b, on the other hand if an unprocessed record remains, then the sequence returns to step S1805b, and the next record is processed. A product identifier is read out from the signature target part d read out in the above-mentioned step and set to a product identifier pid of the new record (step S1809b), and a receiver identifier rid is read out from the signature target part d is read out (step S1810b). A signer identifier is read out from signer private information storage part 17 and set to a signer identifier sid of the new record (step S1811b). The receiver identifier rid read out in step 1810b is compared (step S1812b) with the singer identifier sid read out in step S1811b, and if the receiver identifier rid is equal to the signer identifier sid, the sequence proceeds to step S1813, on the other hand if the receiver identifier rid is not equal to the signer identifier sid, then a message for indicating that the receiver is not identical with the signer is returned and the sequence is brought to an end. The receiver identifier of the product is set to a receiver identifier rid of the new record (step S1813). The residual field of the new record is set (step S1814), a signature target part of the new record is taken out, and set to the variable d (step S1815). The same calculation as performed in step S1807b for the variable data and the variable d and the result is set to the variable data (step S1816). The hash value H (data, pid, sid) of the product identifier pid set in step S1803a or step S1809b, the signer identifier sid set in step S1804a or step S1811b, and the variable data set in step S1816 is calculated (step S1817). The hash function H ( ) is the same as that used in verification process performed by the distribution information verification unit 6 (step S1713 in FIG. 17). Signer private information is read out from the signer private information storage part 17 and set to the variable d (step S1819), signature key information corresponding to the product identifier pid is taken out from the signature key information storage part 14 and set to the variable t, n (step S1819). A first signature value is calculated according to the equation described hereunder, and set to the variable s1 (step S1820).

$$h^{f(d,n,pid,sid)} \bmod n \quad \text{[Equation 31]}$$

Herein, the function f ( ) is a one-way function which returns a uniform value from the argument d, n, pid, and sid from which values of d, n, pid, and sid cannot be derived. For example, the function is the function that a hash function such as SHA-1 or MD5 is applied to a value which is returned to d|n|pid|sid (| is coupling of bit strings), however the function is not limited to a such function. A second signature value is calculated according to the equation described hereunder and set to the variable s2 (step S1821).

$$h^t \bmod n \quad \text{[Equation 32]}$$

A signature value is calculated according to the equation described hereunder by use of the first signature value s1 calculated in step S1820 and the second signature value s2 calculated in step S1821 and set to the variable sign (step S1822)

$$s1 \cdot s2 \bmod n \quad \text{[Equation 33]}$$

A new record is added (step S1823) in the data part in the data carrier 1 through the storing part 5, and the signature value in the data carrier 1 is updated with the value of the variable sign calculated n step S1822 (step S1824).

Eighth Embodiment

Figure 19:
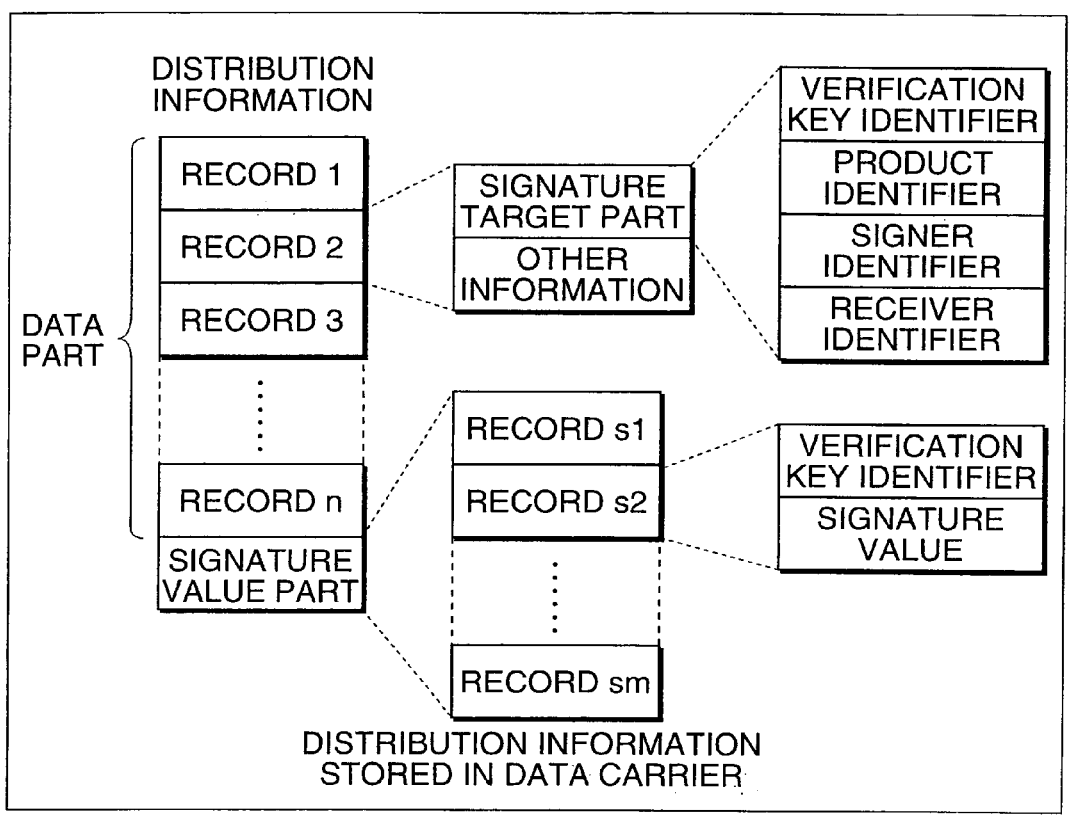
FIG. 19 is a diagram for illustrating the data structure of a distribution information used in the eighth embodiment of the present invention.

FIG. 19 is an example of distribution information stored in the data carrier 1. The distribution information has a data part including plural records and a signature value part, each record has a signature target part and other information as required, the signature target part has at least a verification key identifier, a product identifier, a signer identifier, and a receiver identifier, the signature value part has plural records, each records has a verification key identifier and a signature value.

Figure 20B:
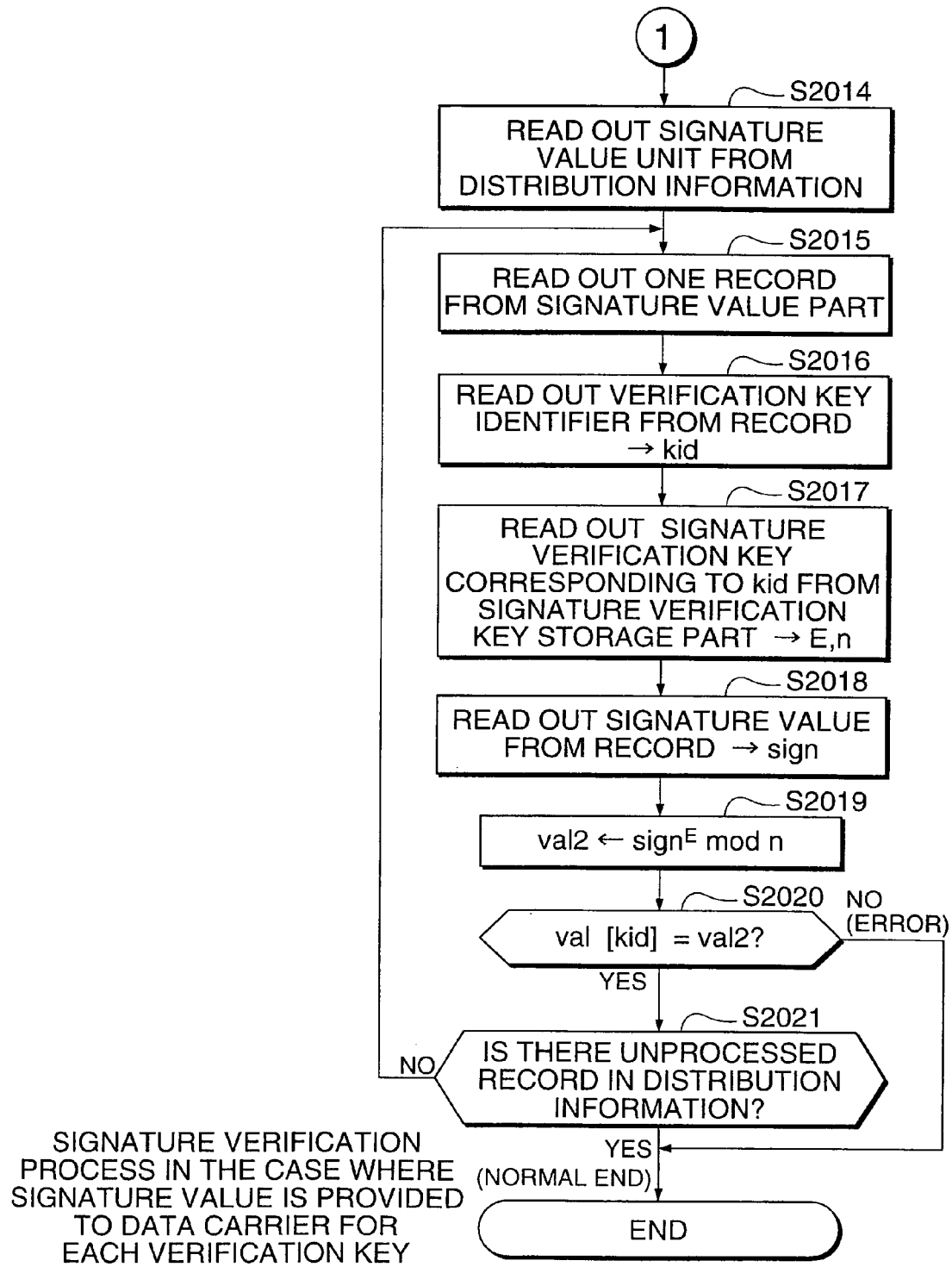
FIG. 20 is a flowchart for describing the flow for verification in the eighth embodiment.

FIG. 20 shows a flow of verification process performed by the distribution information verification unit 6 to verify distribution information shown in FIG. 19. In FIG. 20, a data part is read out from the data carrier (step S2001), one record is read out from the read out data part (step S2002). A signature target part is taken out from the read out record and set to the variable data (step S2003). A product identifier is read out from the signature target part and set to the variable pid (step S2004). A receiver identifier is read out from the signature target part and set to the variable sid (step S2005) A hash value H (data, pid, sid) is calculated by use of the signature target part data read out in step S2003, the product identifier pid read out in step S2004, and the signer identifier sid read out in step S2005, and set to the variable h (step S2006). A verification key identifier is read out from the signature target part, and set to the variable kid (step S2007). Whether the buffer variable val [kid] corresponding to the verification key identifier kid is found is checked, and if the buffer variable val [kid] is not found, then an area is secured (steps S2008 and S2009). 1 is set to the variable val [kid] (step S2010). The signature verification key modulo corresponding to kid is read out from the signature verification key storage part 24, and set to the variable n (step S2011). The equation described hereunder is calculated and set to the variable val [kid] (step S2012).

$$(val[kid]=h) \bmod n \qquad \text{[Equation 34]}$$

Whether an unprocessed record remains in the data part read out in step S2001 is checked (step S2013). If an unprocessed record remains, then the sequence returns to step S2002, and the next record is processed. If an unprocessed record does not remain, then the signature value part is read out from the distribution information (step S2014). One record is read out from the read out signature value part (step 2015). The verification key identifier is readout from the signature target part and set to the variable kid (step S2016). The signature verification key corresponding to the verification key identifier kid is read out from the signature verification key storage part 24, and set to the variable E, n (step S2017). The signature value is read out from the record read out in step S2015, and set to the variable sign (step S2018). A verification value is calculated according to the equation described hereunder by use of the verification key E, n read out in step S2017 and the signature value sign read out in step S2018, and set to the val2 (step S2019).

$$\text{sign}^E \bmod n \qquad \text{[Equation 35]}$$

The value of the variable val [kid] is compared with the value of the variable val2 (step S2020), and if both values are not equal to each other, then a message for indicating that the verification is not successful is returned and the sequence is brought to an end. If both values are equal each other, then whether an unprocessed record remains in the signature value part read out in step S2014 is checked (step S2021). If an unprocessed record remains, then the sequence returns to step S2015 and the next record is processed. If an unprocessed record does not remain, a message for indicating that the verification is successful is returned and the sequence is brought to and end.

Figure 21B:
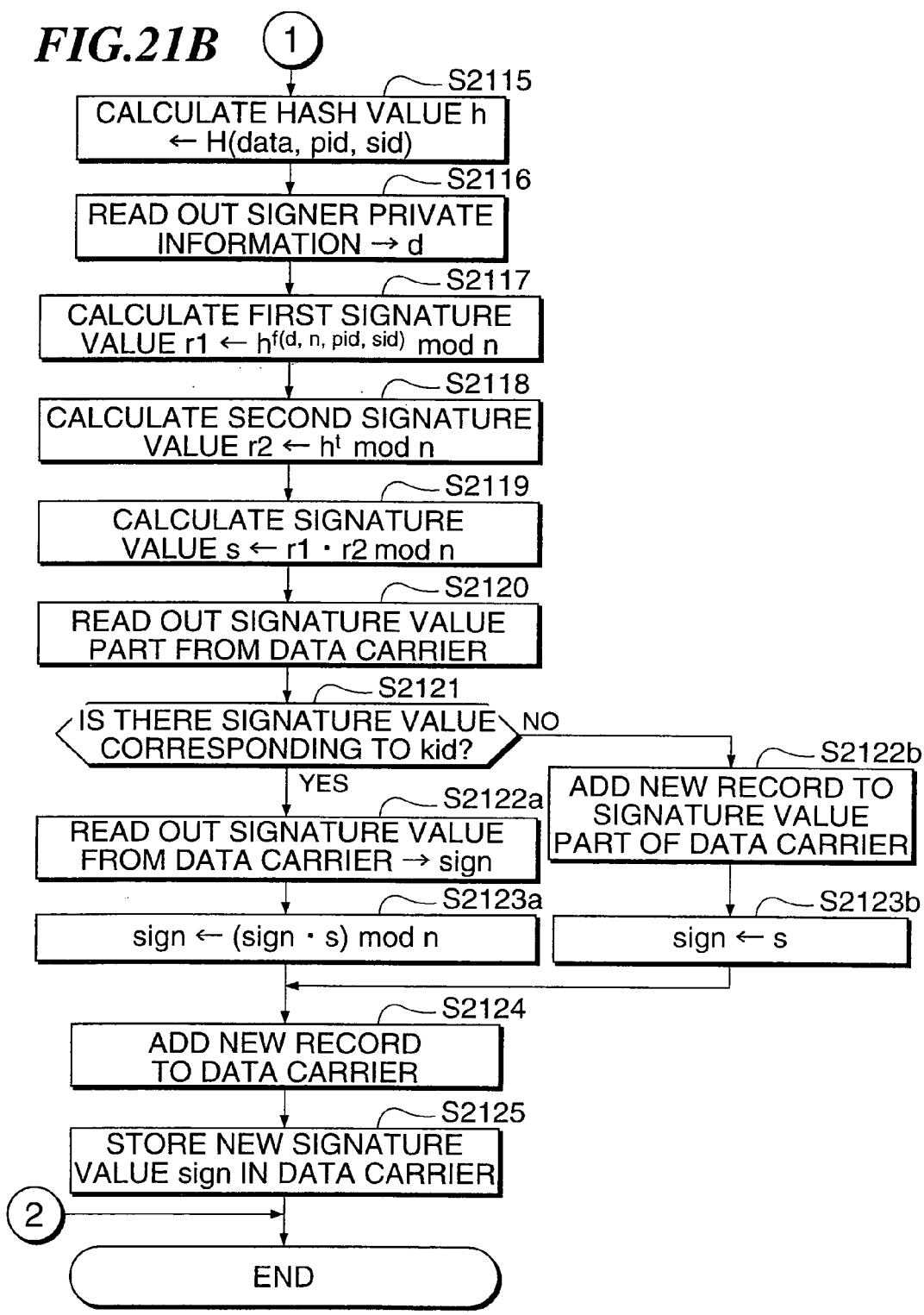
FIG. 21 is a flowchart for describing the flow for signing in the eighth embodiment.

FIG. 21 shows a flow performed by the distribution information generating unit 6 to generate the distribution information shown in FIG. 19. In FIG. 21, whether distribution information stored in the data carrier 1 is found is checked by the reading part 4 (step S2101), and if stored distribution information is not found, then the distribution information generating part 11 sets an identifier of a product to which a data carrier is attached to the product identifier pid of a new record (step S2102a) and sets the identifier of a signer to the signer identifier sid of the new record (step S2103a), and the sequence proceeds to step S2110. The identifiers added in steps S2102a and 82103a are given by a known method such as a method in which the identifiers are read in from a suitable list, which is embedded in advance, specified by a user each time, and any method may be used. If stored distribution information is found in step S2101, then the distribution information is read from the data carrier by the reading part 4 (step S2102b), a data part is read out from the read distribution information (step S2103b). The last record is read out from the read data part (step S2104b), and a signature target part is read out from the read out record (step S3105b). A product identifier is read out from the signature target part and set to the product identifier pid of the new record (step S2106b). A receiver identifier is read out from the signature target part read in step S2104b, and set to the signer identifier sid of the new record (step S2107b). The signature part 16 takes out the signer identifier from the signer private information storage part 17 and set to sid' (step S2108b). The signer identifier sid of the new record is compared with the signer identifier sid' read out from the signer private information storage part 17 (step S2109b), and if sid is not equal to sid', then a message for indicating that the signer is erroneous is returned and the sequence is brought to an end. An identifier of destination (receiver) of the product is set to the receiver identifier rid of the new record (step S2110). The signature key information is read out from the signature key storage part 14, and the signature key information is set to t, the signature key modulo is set to n, and the signature key identifier is set to id (step S2111). The signature key identifier id is set to the verification key identifier kid of the new record (step S2112). A suitable value is set to other field of the new record (step S2113). The signature target part is taken out from the new record and set to the variable data (step S2114). A hash value H (data, pid, sid) is calculated based on the product identifier pid set in step S2102a or step S2106b, the signer identifier sid set in step S2102a or step S2107b, and the signature target part data set in step S2114, and set to the variable h (step S2015). The signature part 16 reads out the signer private information from the first signer private information at rage part 17, and sets it to the variable d (step S2116). The signature part 16 calculates the first signature value according to the equation described hereunder, and sets it to the variable r1 (step S2117)

$$h^{f(d,n,pid,sid)} \bmod n \qquad \text{[Equation 36]}$$

Herein, the function f ( ) is a one-way function which returns a uniform value from the argument d, n, pid, and sid from which values of d, n, pid, and sid cannot be derived. For example, this function is a function that a hash function such as SHA-1 or MD5 is applied to a value which is returned to d|n|pid|sid (| is coupling of bit strings), however the function is not limited to a such function. The distribution information generating part 11 calculates second signature value r2 according to the equation described hereunder (step S2118).

$$h^r \bmod n \qquad \text{[Equation 37]}$$

A signature value is calculated according the equation described hereunder by use of the calculation results r1 and r2 in step S2117 and step S2118 respectively and set to the variable s (step S2119).

$$(r1 \cdot r2) \bmod n \qquad \text{[Equation 38]}$$

The signature value part is read out from the data carrier 1 (step S2120). Whether the signature value corresponding to the verification key identifier kid is found is checked, and if the signature value is found, then the signature value is read out from the data carrier 1, and set to the variable sign (step S2121 and S2122a), sign is calculated according to the equation described hereunder from a set in step S2119 and the signature key number n (step S2123a).

$$(\text{sign} \cdot s) \bmod n \qquad \text{[Equation 39]}$$

If the signature value corresponding to the verification key identifier kid is not found, then a new record is added to the signature value part of the data carrier 1 (step S2122b), and s set in step S2119 is set to sign (step S2123b). The new record generated in the above-mentioned step is added (step S2124) in the data part of the data carrier 1, and the signature value corresponding to the verification key identifier kid of the signature value part of the data carrier 1 is updated with the value of the variable sign calculated in step S2123a or step S2123b (stop S2125).

In the present example, the case in which the signature key information has been already stored in the signature key information storage part 15 is described, however the signature key information may be acquired in advance in the signature information acquiring process or may be acquired by performing a signature information acquiring process when the signature key information is not found in stop S2111.

Furthermore, in the method described hereinabove, step S2117 is performed by the signature part 16 and step S2118 is performed by the distribution information generating part 11, however step S2118 is also performed by the signature part 16, otherwise step S2117 and step 82118 may be calculated in parallel by the signature part 16 and distribution information generating part 11 respectively.

Ninth Embodiment

FIG. 22 shows a flow of a verification process performed by the distribution information unit 6 to verify the distribution information shown in FIG. 19. In FIG. 22, a distribution information is read out from the data carrier 1 by the reading part 4 (step S2201), the data part is read out from the read distribution information (step S2202), and the variables rid, data are cleared (step S2203). One record is read out (step S2204) from the data part read out in step S2202, and a signature target part is read out from the read out record and set to the variable d (step S2205). A signer identifier is read out from the signature target part read out in step S2205 and set to the variable sid (step S2206). Whether a value set to the variable rid is found is checked (step S2207), and if a value to the variable sid is not found, then the sequence proceeds to step S2209, on the other hand if a value is found, then the signer identifier sid read in step S2206 is compared with rid (step S2208). If sid is not equal to rid, then a message for indicating that the record is discontinuous is returned and the sequence is brought to an end, on the other hand if sid is equal to rid, then the sequence proceeds to step S2209. The equation described hereunder is calculated by use of the value of the signature target part d read out in step S2205 and the value of the variable data, and set to the variable data (step S2209).

$$\text{data}|d \text{ (| is coupling of bit strings. If data is cleared,} \\ \text{then d is returned)} \qquad \text{[Equation 40]}$$

Other methods may be used for the calculation in step S2209 as long as the result obtained by use of data and d is one-to-one corresponding to a pair of data and d. Whether an unprocessed record remains in the data part read in step S2202 is checked (step S2210), and if an unprocessed record remains, then a receiver identifier is read out form the signature target part read out in step S2205 and set to the variable rid (step S2211), and the sequence returns to step S2204, the next unprocessed record is processed, if an unprocessed record is not found, then the sequence proceeds to step S2212. A product identifier is read out from the signature target part d read out in step S2205 and set to the variable pid (step S2212). A hash value H (data, pid, sid) is calculated by use of the variable data calculated in the above-mentioned step, the signer identifier sid read out in step S2206, and the product identifier pid read out in step S2212, and set to the variable h (step S2213). Herein, this hash function H( ) is a hash function that a hash function such as SHA-1, MD5 is applied to the returned value which the function F (data, pid, sid), for example, data|pid|sid (| represents the coupling of bit strings) returns a uniformed value from the argument data, pid, sid, and the function F( ) and hash function are not limited specifically. A signature value is read out from the distribution information read out in step S2201 and set to the variable sign (step S2214). The verification k y identifier is readout from the signature target part d read out in step S2205 and set to kid (step S2215). A signature verification key corresponding to the first verification key identifier kid read out from the first verification key storage part 10 in step S2215 is read out, and set to the variable E, n (step S2216). A value for verification is calculated according to the equation described hereunder by use of the signature value sign read out in step S2214 and the signature verification key E, n read out in step S2216 and set to the variable val (step S2217)

$$\text{sign}^E \bmod n \qquad \text{[Equation 41]}$$

The hash value h calculated in step S2213 is compared with the value val for verification calculated in step S2217 (step S2218). If h is equal to val, then a message for indicating that the verification is successful is returned and the sequence is brought to an end, on the other hand if h is not equal to val, then a message for indicating that the verification is not successful is returned and the sequence is brought to an end.

Figure 23B:
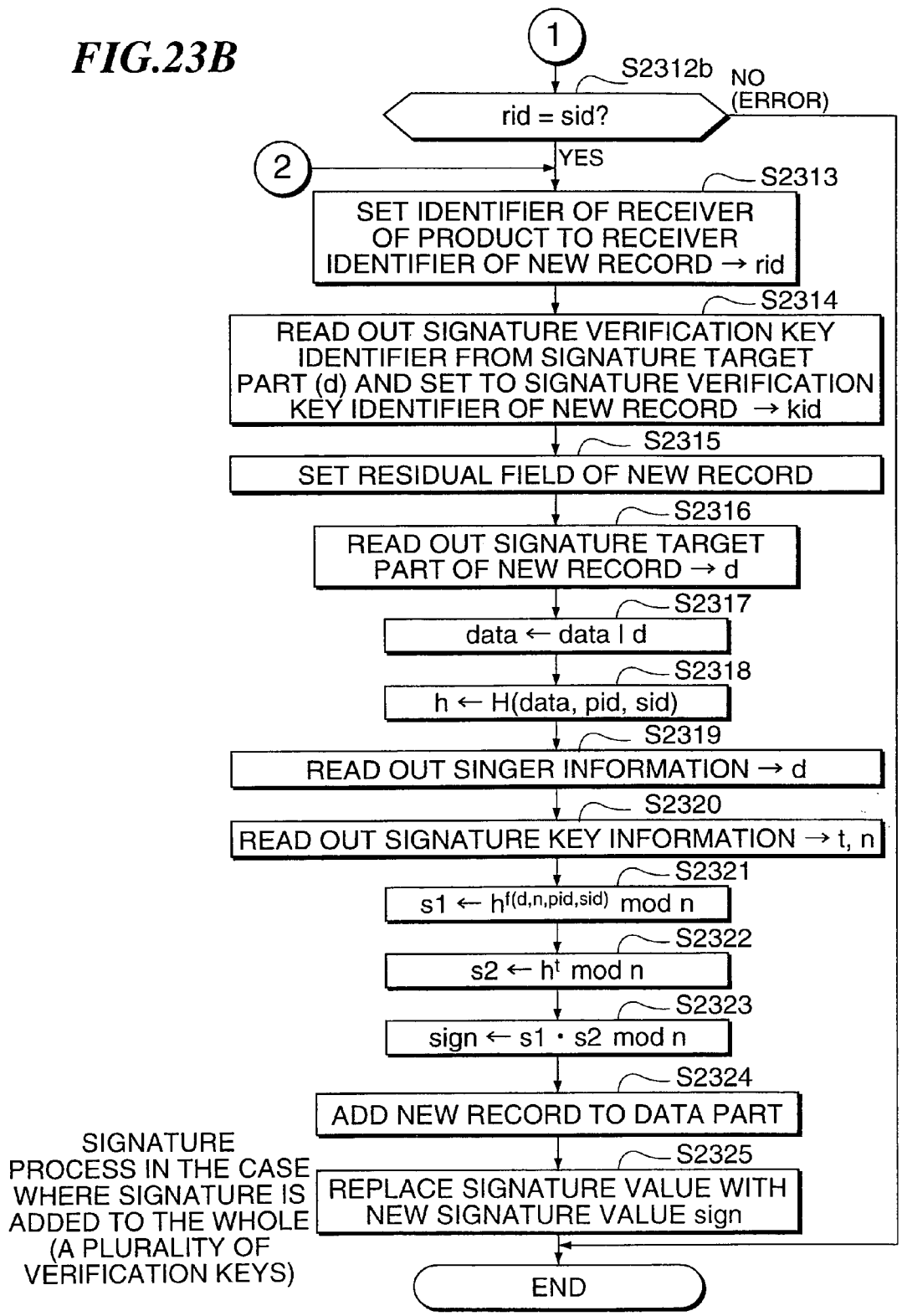
FIG. 23 is a flowchart for describing the flow for signing in the ninth embodiment.

FIG. 23 shows a flow of a process performed by the distribution information generating unit 7 to generate the distribution information shown in FIG. 19. In FIG. 23, the variable data is initialized (step S2301), whether distribution information is found in the data carrier 1 (step S2302) is checked, and if distribution information is not found, then a product identifier pid of a new record to be stored in the data part of the distribution information is set (step S2303a) and a sign r identifier sid of a new record is set (step S2304a) and the sequence proceeds to step S2313. If distribution information is found in step S2302, then the distribution information is read out from the data carrier 1 through the reading part 4 (step S2303b), a data pare is taken out from the read out distribution information (step S2304b), and one record is taken out from the data part (step S2305b) A signature target part of the taken out record is taken out and set to the variable data (step S2306). The equation described hereunder is calculated from the variable data and the signature target part d taken out in step S2306b, and set to the variable data (step S2307b)

$$\text{data}|d \quad \text{(| is coupling of bit strings. If data is cleared, then d is returned)} \quad \text{[Equation 42]}$$

Other methods may be used for calculation in step S2307b as long as the calculation is the same as the verification calculation (step S2209 shown in FIG. 22) performed by the distribution information verification unit 6. Whether an unprocessed record remains in the data part read out in step S2304b is checked (step S2308b), and if an unprocessed record does not remain, the sequence proceeds to step S2309b, on the other hand if an unprocessed record remains, then the sequence returns to step S2305b, and the next record is processed. A product identifier is read out from the signature target part d read out in the above-mentioned step and set to a product identifier pid of the new record (step S2309b), and a receiver identifier rid is read out from the signature target part d (step S2310b). A signer identifier is read out from signer private information storage part 17 and set to a signer identifier sid of the new record (step S2311b). The receiver identifier rid read out in step 2310b is compared (Step S2312b) with the singer identifier rid read out in step S2311b, and if the receiver identifier rid is equal to the signer identifier sid, the sequence proceeds to step S2313, on the other hand if the receiver identifier rid is not equal to the signer identifier sid, then a message for indicating that the receiver is not identical with the signer is returned and the sequence is brought to an end. The receiver identifier of the product is set to a receiver identifier rid of the new record (step S2313). The signature verification key identifier is read out and set to the signature verification key identifier kid (step S2314). The residual field of the new record is set (step S2315) a signature target part of the new record is taken out, and set to the variable d (step S2316) The same calculation as performed in step S2307b for the variable data and the variable d and the result is set to the variable data (step S2317). A Hash value H (data, pid, sid) for the product identifier pid set in step S2303a or step S2309b, the signer identifier sid set in step S2304a or step S2311b, and the variable data set in step S2317 is calculated (step S2318). The hash function H ( ) is the same as that used in verification process performed by the distribution information verification unit 6 (step S2213 in FIG. 22). Signer private information is read out from the signer private information storage part 17 and set to the variable d (step S2319), signature key information corresponding to the product identifier pid is taken out from the signature key information storage part 14 and set to the variable t, n (step S2320). A first signature value is calculated according to the equation described hereunder, and set to the variable s1 (step S2321).

$$h^{f(d,n,pid,sid)} \bmod n \quad \text{[Equation 43]}$$

Herein, the function f ( ) is a one-way function which returns a uniform value from the argument d, n, pid, and sid from which values of d, n, pid, and sid cannot be derived. For example, this function is a function that a hash function such as SHA-1 or MD5 is applied to a value which is returned to d|n|pid|sid (| is coupling of bit strings), however the function is not limited to a such function. A second signature value is calculated according to the equation described hereunder and set to the variable s2 (step S2322).

$$h^t \bmod n \quad \text{[Equation 44]}$$

A signature value is calculated according to the equation described hereunder by use of the second signature value s1 calculated in step S2320 and the second signature value s2 calculated in step S2322 and set to the variable sign (step S2323)

$$(s1 \cdot s2) \bmod n \quad \text{[Equation 45]}$$

A new record is added (step S2324) in the data part in the data carrier 1 through the storing part 5, and the signature value in the data carrier 1 is updated with the value of the variable sign calculated in step S2323 (step S2325).

Tenth Embodiment

Figure 24:
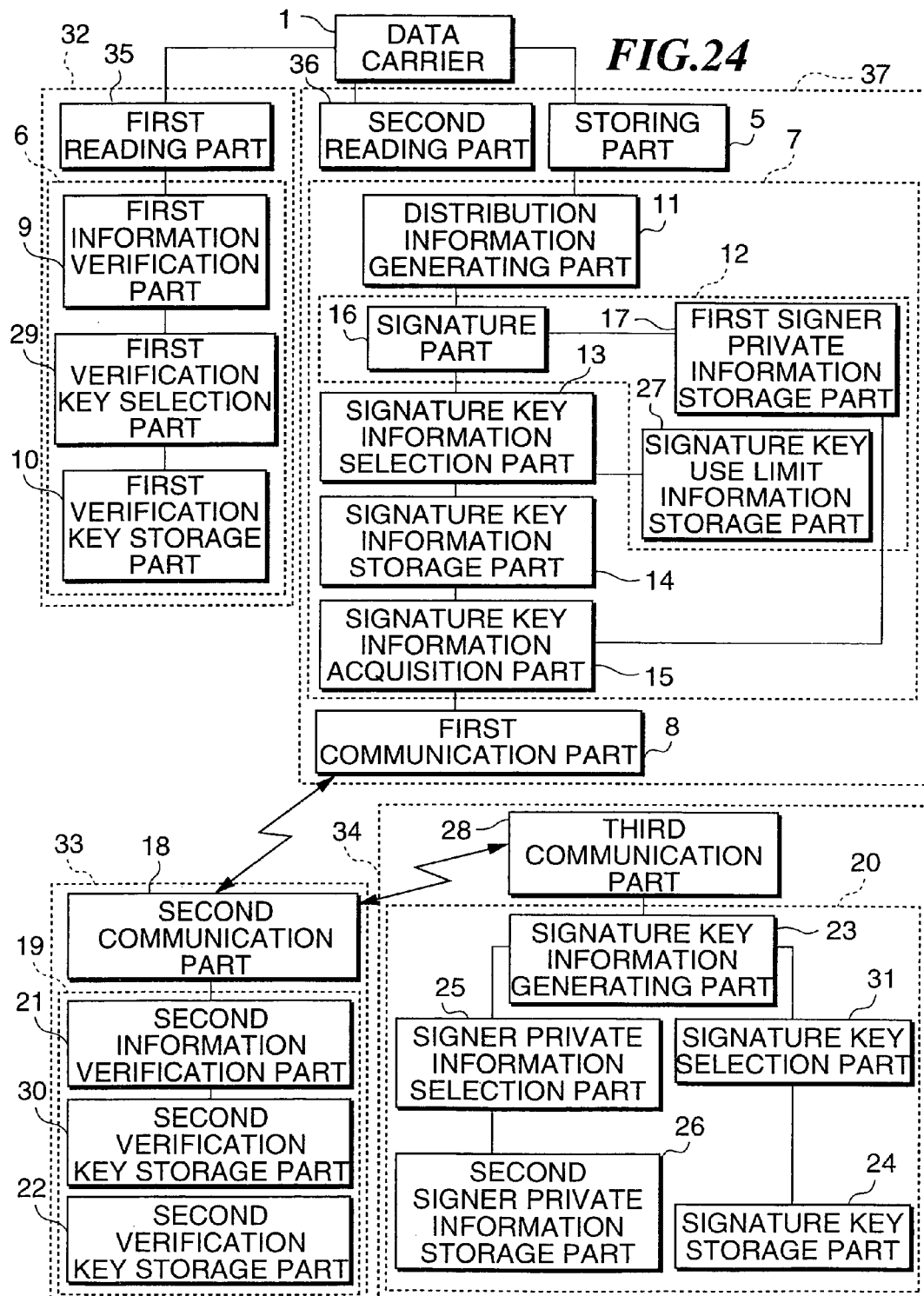
FIG. 24 is a block diagram for illustrating the structure of the tenth embodiment of the present invention.

FIG. 24 shows an example in which the distribution information processing module 2 and the distribution information management module 3 shown in FIG. 1 are separated into partial modules respectively. In FIG. 24, the distribution information processing module 2 (FIG. 1) is separated into a first verification module 32 and a storing module 37. Furthermore, the distribution information management module 3 (FIG. 1) is separated into a second verification module 33 and a signature key information generating module 34. The first verification module 32 and the storing module 37 are provided with first reading part 35 and second reading part 36 respectively. The signature key information generating module 34 is provided with a third communication part 28, which communicates with the second verification module 33. The same components shown in FIG. 24 as those shown in FIG. 1 or FIG. 6 are given with the same characters shown in FIG. 1 or FIG. 6 and the description is omitted.

As described hereinbefore, according to the present invention, it is not required for distributors to acquire a certificate from a certificate authority, the private information is contained in an anti-tampering container such as an IC card which is preferable for security, a large scale facility is not required, a distribution management system which is easy for management is thereby implemented. In the case where the number of times of signing is limited in the present invention, the fraudulence such as that the same ID as used for the genuine product is used for the fraudulent product with the signature and the fraudulent product is shipped to another receiver is prevented.

What is claimed is:

1. A distribution information management system, comprising:
    a data carrier attached to an article that stores information relative to the article, the data carrier being an electronic tag;
    a distribution information processing module that reads information from and stores information to the data carrier, and
    a distribution information management module that the distribution information processing module communicates with via first and second communication parts, the distribution information management module managing information relative to distribution of the article, the distribution information processing module comprising:
    a reading part that reads out the information of the data carrier;

a storing part that stores the information in the data carrier;
a first information verification unit that verifies the information read out from the data carrier;
an information generating unit that processes the information to be stored in the data carrier, wherein the information includes at least a signer identifier that is a receiver identifier of last information stored in the data carrier; and
a first communication part that communicates with the distribution information management module,
the first information verification unit comprising:
a first information verification part that verifies the information read out from the data carrier by a verification key; and
a first verification key storage part that stores the verification key used by the first information verification part for verification of the information, and
the information generating unit comprising:
a distribution information generating part that generates the information to be stored in the data carrier;
a signature module that performs signature generating process;
a signature key information storage part that stores the signature key information used by the signature module for generating a digital signature;
a signature key information selection part that selects a signature key information stored in the signature key storage part; and
a signature key information acquisition part that acquires the signature key information from the distribution information management module,
the signature module comprising:
a signature part that generates the digital signature for the information generated by the distribution information generating part;
a first signer private information storage part that stores signer private information used by the signature part for generating the digital signature; and
a signature key use limit information storage part that stores a signer key use limit information to indicate whether the signature key information is already used, and the distribution information management module comprising:
a second communication part that communicates with the distribution information processing module;
a second information verification unit that processes the information received from the distribution information processing module; and
a signature key information generating unit that processes the signature key information to be sent to the distribution information processing module;
the second information verification unit comprising:
a second information verification part that verifies the information received from the distribution information processing module; and
a second verification key storage part that stores the verification key used by the second information verification part for verification of the information, the signature key information generating unit comprising:
a signature key information generating part that generates a signature key information used by the distribution information processing module for generating a distribution information;
a signature key storage part that stores the signature key used by the signature key information generating part for generating signature key information;
a signer private information selection part that selects signer private information used by the signature key information generating part for generating signature key information; and
a second signer private information storage part that stores the signer private information,
wherein the information generating unit has a signature key use limit information storage part that limits a specified number of times for signatures performed using the signature key, the signature key information selection part does not select signature key information used more than a specified number of times for signature.

2. The distribution information management system according to claim 1, wherein the signature module is detachable from the distribution information processing module.

3. The distribution information management system according to claim 1, wherein the signature module is tamperproof.

4. The distribution information management system according to claim 1, wherein the signature key use limit information storage part is disposed in the signature module.

5. The distribution information management system according to claim 1, the distribution information processing module, further comprising:
an information verification module; and
an information generating module,
the information verification module comprises:
a first reading part that reads the information of the data carrier, and
a first information verification unit that processes the information read out from the data carrier,
the information generating module comprises:
a second reading part that read the information of the data carrier;
a storing part that stores the information in the data carrier; and
an information generating unit that processes the information to be stored in the data carrier.

6. The distribution information management system according to claim 1, the distribution information management module, further comprising:
a second information verification module; and
a signature key information generating module, and
the second information verification module comprises:
a distribution information verification unit; and
a second communication part, and
the signature key information generating module comprises:
a signature key generating part; and
a third communication part.

7. The distribution information management system according to claim 1, wherein the verification key stored in the first verification key storage part and the second verification key storage part is common for all the distribution information processing modules and distribution information management modules.

8. The distribution information management system according to claim 1, wherein the first information verification part and the second information verification part perform using the same processing method.

9. The distribution information management system according to claim 1, wherein the first information verification unit has a first verification key selection part that selects the verification key used by the first information verification part.

10. The distribution information management system according to claim 8, wherein the second information verification unit has a second verification key selecting part that selects the verification key used by the second information verification part.

11. The distribution information management system according to claim 10, wherein the information stored in the data carrier contains at least a distribution information management module identifier, and which information is stored as one unit.

12. The distribution information management system according to claim 1, wherein the signature key information generating unit has a signature key selection part that selects a signature key.

13. The distribution information management system according to claim 1, wherein the information stored in the data carrier further comprises at least a product identifier, an identifier of a receiver at a destination of the article and a signature value, and which information is stored as one unit.

14. The distribution information management system according to claim 13, wherein the information stored in the data carrier contains at least a verification key identifier, and which information is stored as one unit.

15. The distribution information management system according to claim 1, wherein the information stored in the data carrier as one unit includes at least a product identifier, and identifier of a receiver at a destination of the article and a signature value separately from the information for unit.

16. The distribution information management system according to claim 1, wherein the information stored in the data carrier further contains at least a product identifier, an identifier of a receiver at a destination of the article and a verification key identifier and which information is stored as one unit, and the information has a signature value corresponding to the verification key identifier for each verification identifier.

17. A distribution information processing module, comprising:
a reading part that reads out information of a data carrier, the data carrier being an electronic tag attached to an article that stores information relative to the article;
a storing part that stores information in the data carrier;
a first information verification unit that verifies the information read out from the data carrier;
an information generating unit that processes the information to be stored in the data carrier, wherein the information includes at least a signer identifier that is a receiver identifier of last information stored in the data carrier; and
a communication part that communicates with a distribution information management module information relative to the article processed by the distributed information processing module for the distribution information management module to manage information relative to distribution of the article,
the first information verification unit comprising:
a first information verification part that verifies the information read out from the data carrier by a verification key; and
a first verification key storage part that stores the verification key used by the first information verification part for verification of the information, and
the information generating unit comprising:
a distribution information generating part that generates the information to be stored in the data carrier;
a signature module that performs signature generating process;
a signature key storage part that stores the signature key information used by the signature module for generating a digital signature;
a signature key information selection part that selects signature key information stored in the signature key storage part; and
a signature key information acquisition part that acquires the signature key information from the distribution information management module,
the signature module comprising:
a signature part that generates the digital signature for the information generated by the distribution information generating part;
a first signer private information storage part that stores signer private information used by the signature part for generating the digital signature; and
a signature key use limit information storage part that stores a signer key use limit information to indicate whether the signature key information is already used,
wherein the information generating unit has a signature key use limit information storage part that limits a specified number of times for signatures performed using the signature key, the signature key information selection part does not select signature key information used more than a specified number of times for signature.

18. A computer program product recorded on a computer-readable medium for distribution information processing, wherein a computer executes a process comprising:
a reading step for reading out information of a data carrier, the data carrier being an electronic tag attached to an article that stores information relative to the article;
a storing step for storing information in the data carrier;
a first information verification step for verifying the information read out from the data carrier;
an information generating step for processing the information to be stored in the data carrier; and
a communicating step for communicating with a distribution information management module,
the first information verification step comprises:
a first information verification sub-step for verifying the information read out from the data carrier; and
a first verification key storage sub-step for storing the verification key used in the first information verification sub-step for verification of the information, and
the information generating step comprises:
a distribution information generating sub-step for generating the information to be stored in the data carrier, wherein the information includes at least a signer identifier that is a receiver identifier of last information stored in the data carrier;
a signature sub-step for performing signature generating process;
a signature key storage step for storing the signature key information used in the signature sub-step for generating a digital signature;
a signature key information selection step for selecting a signature key information stored in the signature key storage sub-step; and
a signature key information acquisition sub-step for acquiring the signature key information from the distribution information management module,
the signature sub-step comprises:
a signature micro-step for generating the digital signature for the information generated by the distribution information generating module in response to a signer key use limit information indicating that the signature key information is not already used; and a first signer private information storage micro-step for storing signer private information used in the signature micro-step for generating the digital signature, wherein the information generating step has a signature key use limit information storage step that limits a specified number of times for signatures performed using the signature key, the signature key information selection step does not select signature key information used more than a specified number of times for signature.

19. A distribution information management system having a distribution information processing module, the distribution information processing module comprising:

a reading part that reads out information of a data carrier, the data carrier being an electronic tag attached to an article that stores information relative to the article, a storing part that stores information in the data carrier;

a first information verification unit that verifies the information read out from the data carrier;

an information generating unit that processes the information to be stored in the data carrier; and a first communication part that communicates with the distribution information management module, the first information verification unit comprising:

an information verification part that verifies the information read out from the data carrier by a verification key; and a verification key storage part that stores the verification key used by the first information verification part for verification of the information, and the information generating unit comprising:

a distribution information generating part that generates the information to be stored in the data carrier, wherein the information includes at least a signer identifier that is a receiver identifier of last information stored in the data carrier;

a signature module that performs signature generating process;

a signature key storage part that stores the signature key information used by the signature module for generating a digital signature;

a signature key information selection part that selects signature key information stored in the signature key storage part; and a signature key information acquisition part that acquires the signature key information from the distribution information management module, the signature module comprising:

a signature part that generates the digital signature for the information generated by the distribution information generating part;

a first signer private information storage part that stores a signer private information used by the signature part for generating the digital signature; and a signature key use limit information storage part that stores a signer key use limit information to indicate whether the signature key information is already used, and the distribution information management module comprising:

a second communication part that communicates with the distribution information processing module; and a signature key information generating unit that processes the signature key information to be sent to the distribution information processing module, the signature key information generating unit comprising:

a signature key information generating part that generates signature key information used by the distribution information processing module for generating distribution information;

a signature key storage part that stores the signature key used by the signature key information generating part for generating signature key information;

a signer private information selection part that selects a signer private information used by the signature key information generating part for generating signature key information; and a second signer private information storage part that stores the signer private information, wherein the information generating unit has a signature key use limit information storage part that limits a specified number of times for signatures performed using the signature key, the signature key information selection part does not select signature key information used more than a specified number of times for signature.

20. A distribution information management system having a distribution information module, the distribution information processing module comprising:

a storing part that stores information in the data carrier, the data carrier being an electronic tag attached to an article that stores information relative to the article, an information generating unit that processes the information to be stored in the data carrier; and a first communication part that communicates with the distribution information management module, and the information generating unit comprising:

a distribution information generating part that generates the information to be stored in the data carrier, wherein the information includes at least a signer identifier that is a receiver identifier of last information stored in the data carrier;

a signature module that performs signature generating process;

a signature key storage part that stores the signature key information used by the signature module for generating a digital signature;

a signature key information selection part that elects signature key information stored in the signature key storage part; and a signature key information acquisition part that acquires the signature key information from the distribution information management module, the signature module comprising:

a signature part that generates the digital signature for the information generated by the distribution information generating part;

a first signer private information storage part that stores signer private information used by the signature part for generating the digital signature; and a signature key use limit information storage part that stores a signer key use limit information to indicate whether the signature key information is already used, and the distribution information management module comprising:

a second communication part that communicates with the distribution information processing module;

an information verification unit that processes the information received from the distribution information processing module; and
a signature key information generating unit that processes the signature key information to be sent to the distribution information processing module;
the information verification unit comprising:
an information verification part that verifies the information received from the distribution information processing module; and
a verification key storage part that stores the verification key used by the information verification part for verification of the information,
the signature key information generating unit comprising:
a signature key information generating part that generates signature key information used by the distribution information processing module for generating distribution information;
a signature key storage part that stores the signature key used by the signature key information generating part for generating a signature key information,
a signer private information selection part that selects signer private information used by the signature key information generating part for generating signature key information; and
a second signer private information storage part that stores the signer private information,
wherein the information generating unit has a signature key use limit information storage part that limits a specified number of times for signatures performed using the signature key, the signature key information selection part does not select signature key information used more than a specified number of times for signature.

* * * * *